United States Patent [19]

Smith

[11] Patent Number: 4,965,794

[45] Date of Patent: Oct. 23, 1990

[54] TELECOMMUNICATIONS FIFO

[75] Inventor: Michael D. Smith, Lewisville, Tex.

[73] Assignee: Dallas Semiconductor Corporation, Dallas, Tex.

[21] Appl. No.: 366,709

[22] Filed: Jun. 13, 1989

Related U.S. Application Data

[63] Continuation of Ser. No. 105,739, Oct. 5, 1987, Pat. No. 4,839,893.

[51] Int. Cl.⁵ ............................................. H04J 3/06
[52] U.S. Cl. ................................. 370/105.1; 375/118
[58] Field of Search ............... 370/84, 100.1, 108, 370/103, 105.1, 105.2, 105.3, 60, 94.1; 375/118

[56] References Cited

U.S. PATENT DOCUMENTS

| | | | |
|---|---|---|---|
| 3,867,579 | 2/1975 | Colton et al. | 375/118 |
| 4,322,844 | 3/1982 | Fellinger et al. | 370/84 |
| 4,352,181 | 9/1982 | LeDieu et al. | 370/108 |
| 4,402,079 | 8/1983 | Fellinger et al. | 370/84 |
| 4,429,386 | 1/1984 | Graden | 375/118 |
| 4,617,659 | 10/1986 | Chopping et al. | 370/105.1 |
| 4,692,894 | 9/1987 | Bemis | 370/84 |
| 4,764,942 | 8/1988 | Shigaki et al. | 375/118 |
| 4,839,893 | 6/1989 | Smith | 370/105.1 |

Primary Examiner—Benedict V. Safourek
Assistant Examiner—Melvin Marcelo
Attorney, Agent, or Firm—Worsham, Forsythe, Sampels & Wooldridge

[57] ABSTRACT

A telecommunications FIFO provides an interface between two serial data transmission channels which have independent clocks and which can operate according to different protocols. The FIFO contains two storage registers each equal to a frame of data in length. Data is written into and read from alternate storage registers with the transfer between one register and the other occurring upon the receipt of write and read frame sync pulses respectively. At the receipt of each write frame sync pulse and read frame sync pulse, the read address location and the write address location respectively are sampled to determine if a FIFO overfill or empty condition is eminent. If such condition exists, the telecommunications FIFO does not switch registers, but rather rewrites the same register or rereads the same register respectively, to thereby perform a slip operation.

17 Claims, 12 Drawing Sheets

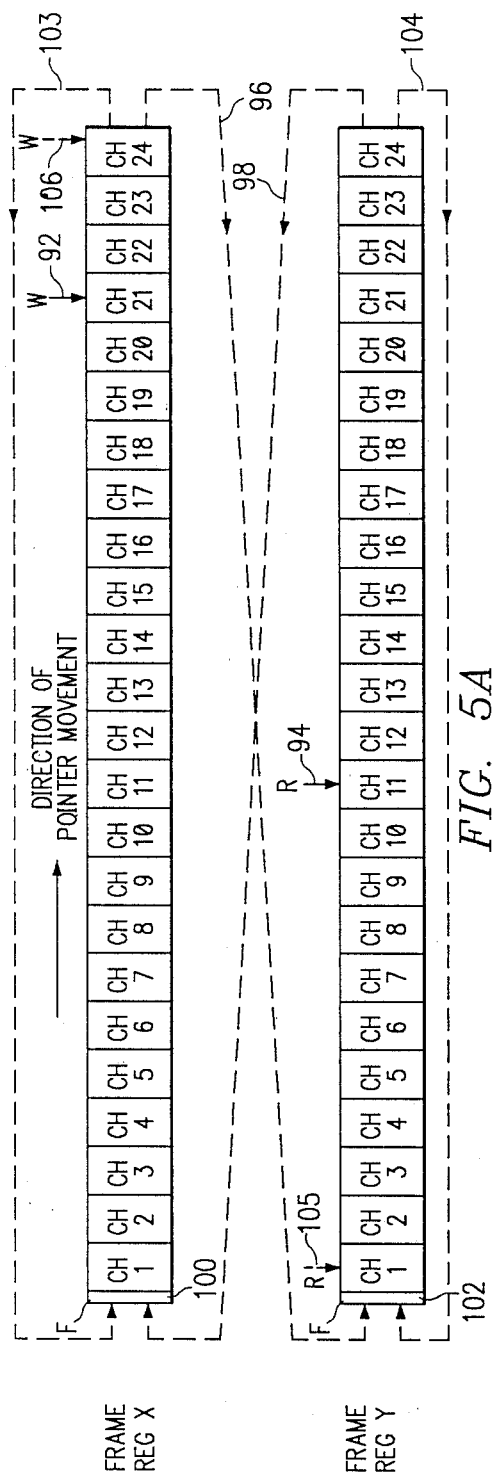
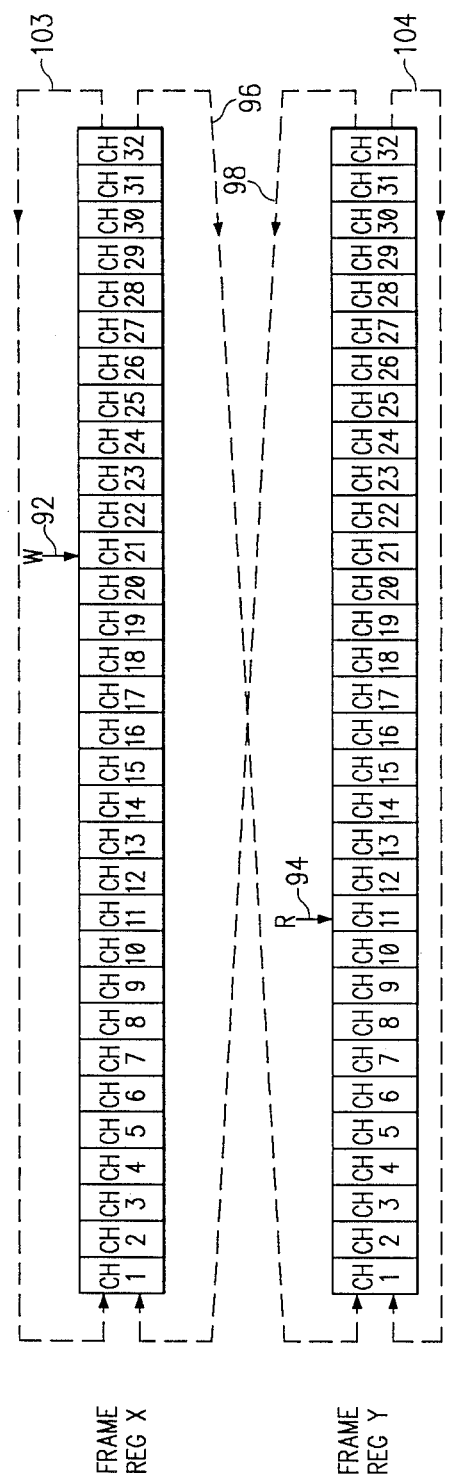
FIG. 5A
FIG. 5B

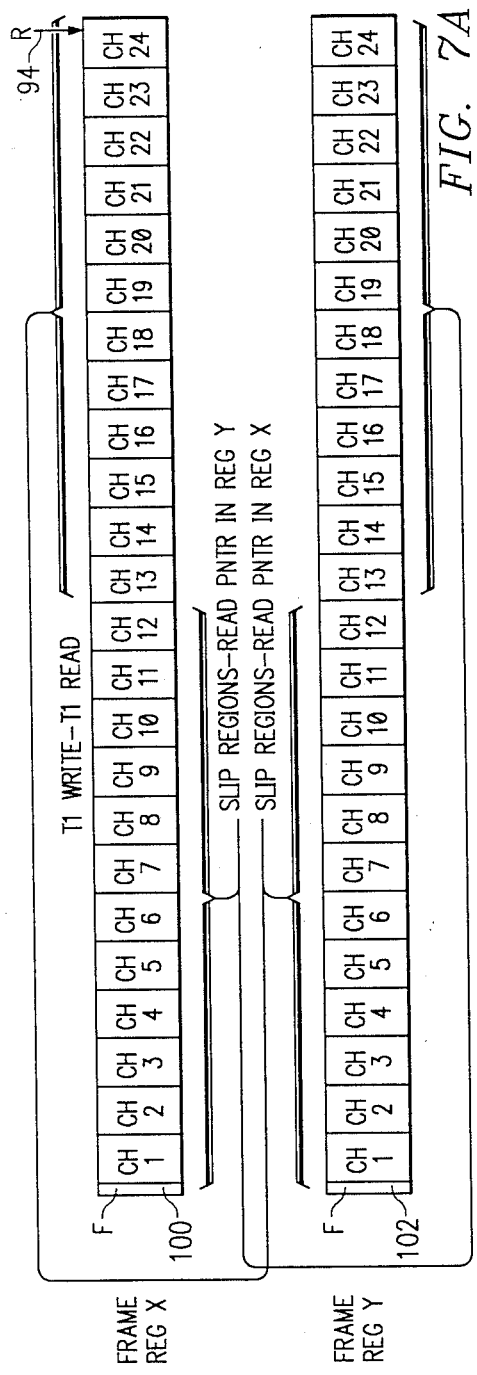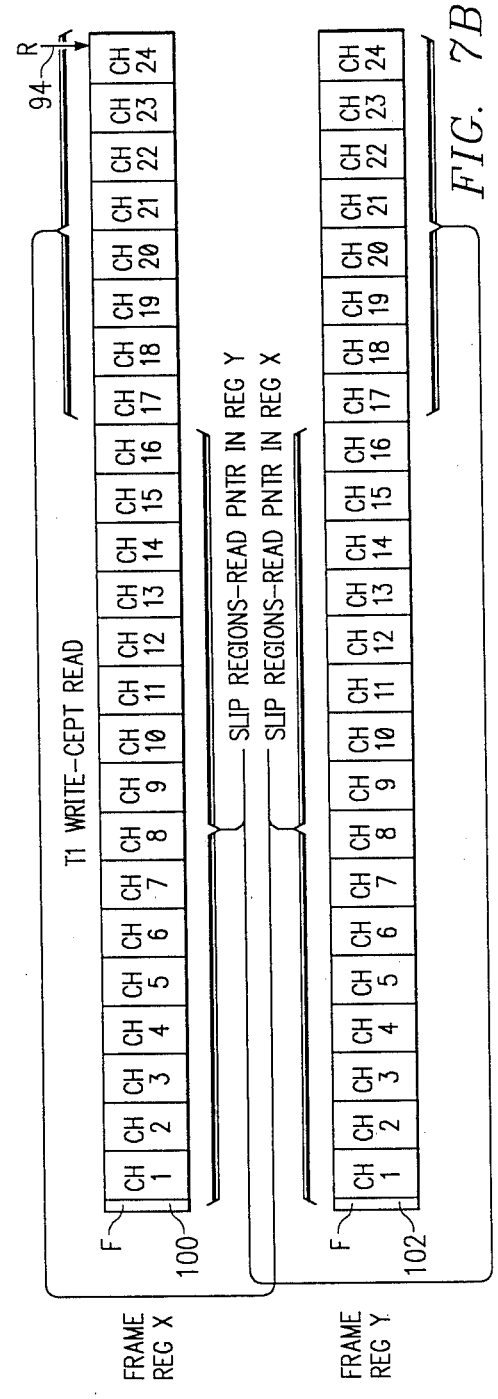

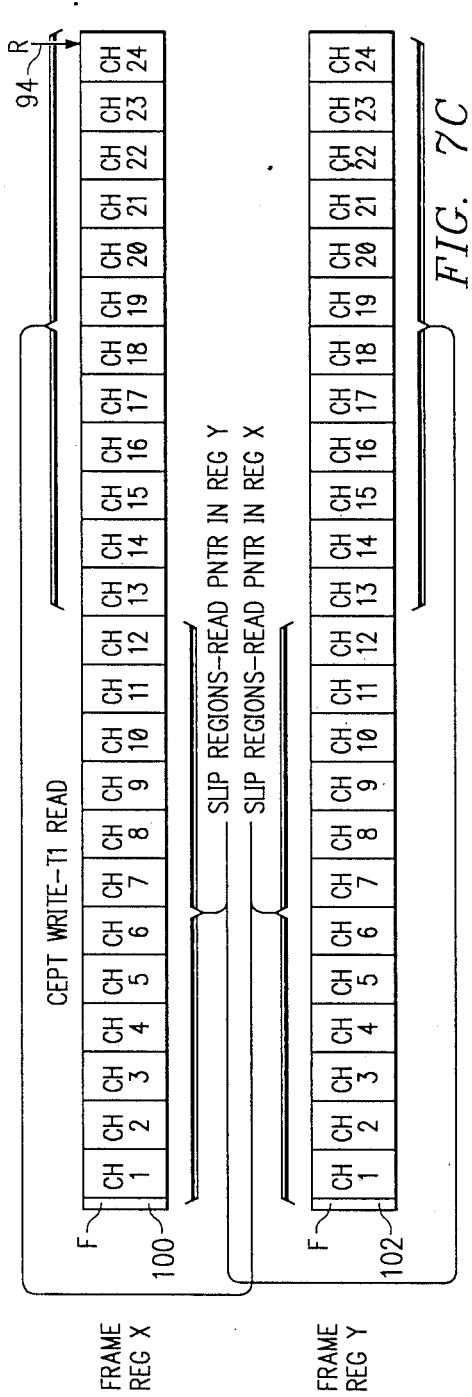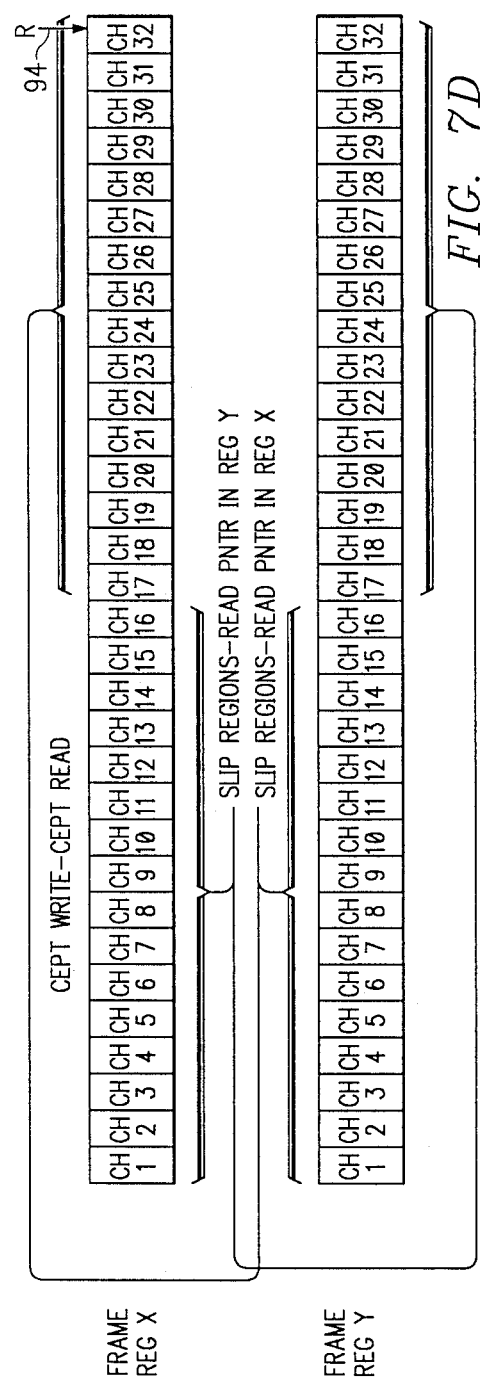

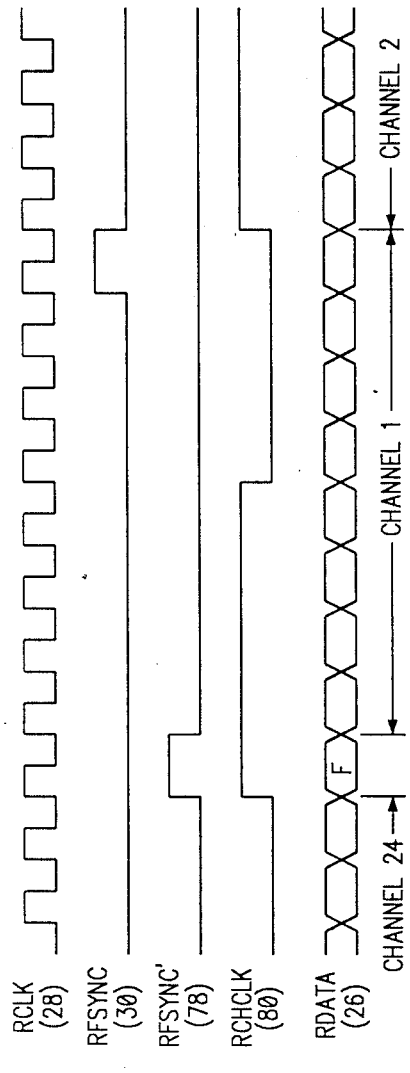
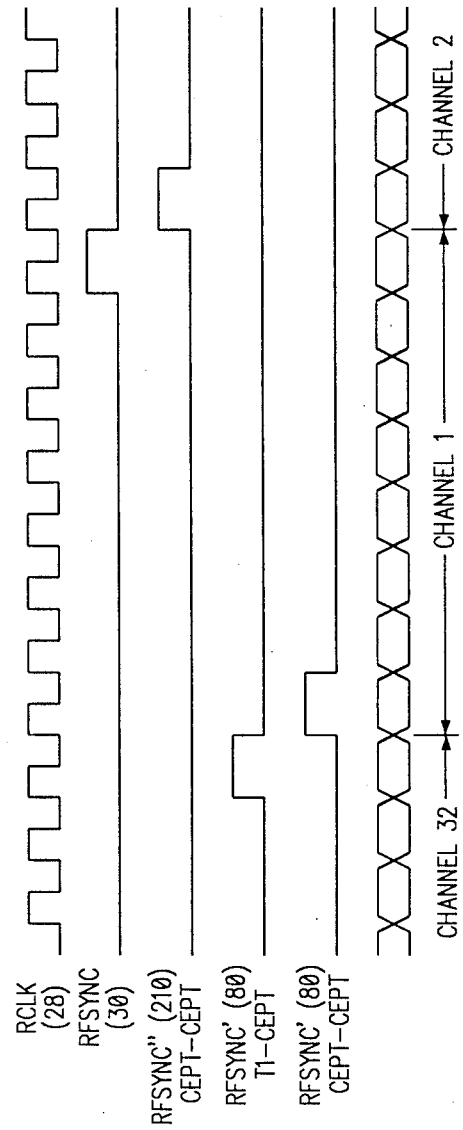
FIG. 14A
FIG. 14B

TELECOMMUNICATIONS FIFO

This is a continuation of application Ser. No. 105,739, filed 10/5/87, and now issued as U.S. Pat. No. 4,839,893.

TECHNICAL FIELD

This invention relates to circuitry for telecommunications, and more particularly, to telecommunications FIFO circuitry.

BACKGROUND OF THE INVENTION

Long distance data transmission is usually in the form of serial data transfer. Several specifications or protocols for such long distance data transmission have been promulgated. Two of the most used specifications are the T1 protocol, widely used in the United States, and the CEPT protocol, commonly used in Europe.

In the T1 protocol the serial data is organized into 24 data channels of 8 bits each (192 bits) preceded by a framing bit for a total of 193 bits. This 193 bit data packet constitutes a single frame of data. The CEPT protocol has 32 channels of 8 bits each for a total of 256 bits. This 256 bits also constitutes a single frame. The T1 bit rate is 1.544 megabits per second or 125 milliseconds per frame. The CEPT bit rate is 2.048 megabits per second or 125 milliseconds per frame. Thus, each frame of the CEPT protocol contains more bits and transfers these bits at a higher bit rate than the T1 protocol, but the time required to transfer a single frame of data in the CEPT protocol is equal to the time required to transfer a single frame of data in the T1 protocol.

A problem which arises in long distance serial data transmission is the asynchronization of the transmission and receiving clocks at data multiplexer locations. Neither the T1 protocol nor the CEPT protocol use a single clock which is synchronized throughout the data network, but rather rely on tightly specifying the data transmission rate to a tolerance of several hundred parts per million. However, since the transmission and receiving clocks at a multiplexer point are not synchronized, a method to compensate for this lack of synchronization is to provide a first-in, first-out (FIFO) buffer in which data is written into the buffer using the transmission clock frequency and read from the buffer at the receiving clock frequency. The FIFO thus acts as a buffer to absorb short term variations in frequency between the transmitting clock and the receiving clock.

However, the FIFO buffer by itself is not sufficient to compensate for long term frequency differentials because the excess data being written into or read from the FIFO would sooner or later be greater than the depth of the FIFO. In these conditions, the differences in the clocks are resolved by a "slip" operation in which a frame of data is either dropped completely if the transmission clock is faster than the receiving clock, or a frame of data is read twice in succession if the receiving clock is faster than the transmission clock. Both the T1 and the CEPT specifications require that the slip operation occur at frame boundaries. That is, a whole frame must be slipped: the packet of data constituting a frame cannot be divided. In the T1 protocol the rising edge of the framing bit is coincident with the rising edge of the frame sync pulse and forms the boundary between frames. In the CEPT protocol the rising edge of bit 1 of the first channel forms the boundary between frames. However, in the CEPT protocol the position of the frame sync pulse may be coincident with the first bit of the first channel or may be coincident with the eighth bit of the 32nd channel depending on the convention being used.

A FIFO is a memory storage device in which data is sequentially written into the FIFO and sequentially read out from the FIFO. The reading and writing operations are independent of each other and thus the memory location being written into may be the same or different from the memory location being read from. Since the memory locations being written into or read from are advanced sequentially with the write clock and the read clock respectively, the FIFO does not have any external address lines.

It is convenient when discussing the operation of a FIFO to talk of a write pointer and a read pointer. The position of the write pointer is the location of the memory cell being written into, and the position of the read pointer is the location of the memory cell being read from at any point. In the ideal operation of a FIFO, data is written into the FIFO and read from the FIFO at the same rate so that each memory location is alternately written into and read from. However, if the write clock is faster than the read clock, then the write pointer will be sequencing through the address positions faster than the read pointer. At some point then, the write pointer will pass the read pointer and the FIFO will write data into memory locations before the previous data has been read out. Conversely, if the read clock is faster than the write clock, at some point data will be read from the same memory location twice before new data is written into the memory location. When the write pointer catches up with the read pointer or when the read pointer catches up with the write pointer, a collision or contention occurs. In order to avoid a collision, a FIFO generally has circuitry to warn of an impending collision.

Presently available from several suppliers are standard FIFOs. In order to warn of an impending collision, the standard FIFOs have an empty flag and a full flag which signal when the write and read pointers are within one byte of each other. In the standard FIFOs these "bytes" are 9 bits wide, having an extra bit for parity.

The standard FIFOs are not well suited for use with the T1 and CEPT protocols for several reasons. First, only 8 of the 9 bits can be mapped directly to a channel, thus either wasting memory space or requiring additional overhead logic. Secondly, the frame boundaries must be stored and correlated with external logic. Thirdly, one byte warning distance may be an insufficient warning in order to initiate a slip operation before a collision occurs.

Thus, it can be appreciated that it would be highly desirable to have a FIFO which would be able to slip on frame boundaries, which would provide sufficient warning of a collision to allow time for a slip operation before the collision, which would delete/repeat exactly one frame of data during a slip, and which is suitable for use with T1, CEPT, and combinations of T1/CEPT protocols.

SUMMARY OF THE INVENTION

It is, therefore, an object of this invention to provide a telecommunications FIFO which is able to slip on frame boundaries, which is able to detect an impending collision in time to initiate a slip operation, which would delete/repeat exactly one frame of data during a slip, and which is suitable for use with T1, CEPT, and combinations of T1/CEPT protocols.

Shown in an illustrated embodiment of the invention is a FIFO for receiving and storing a serial bit stream of data and for reading out stored data. The FIFO has circuitry for writing data into a first register and a second register. Write register control circuitry is also included that selects which register data is to be written into. Circuitry is included for detecting at predetermined intervals, whether predetermined relationship exists between the bit location being read from and the bit location register being written into. If such relationship exists, the detection circuitry causes the write register control circuitry to continue to write data into the same register; and if such relationship does not exist, the detection circuitry causes the write register control circuitry to change the register that data is being written into.

BRIEF DESCRIPTION OF THE DRAWINGS

The aforementioned and other features, characteristics, advantages, and the invention in general will be better understood from the following, more detailed description taken in conjunction with the accompanying drawings in which:

FIGS. 5A-5B, 6A-6D, and 7A-7D are symbolic diagrams of the frame register X and the frame register Y of the telecommunications FIFO shown in FIG. 4;

FIGS. 14A and 14B shows timing diagrams for a portion of the logic circuitry shown in FIG. 13.

Figure 1:
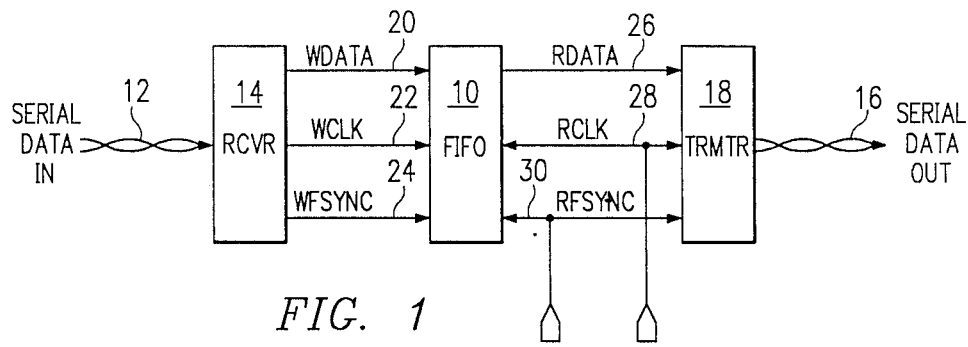
FIG. 1 is a block diagram of an interface between two digital serial transmission lines which includes a telecommunications FIFO according to the present invention.

It will be appreciated that for purposes of clarity where deemed appropriate, reference numerals have been repeated in the figures to indicate corresponding features, and, in the timing diagrams, some propagation delay times through logic circuits have been exaggerated.

DESCRIPTION OF THE PREFERRED EMBODIMENT

The telecommunications FIFO of the present invention overcomes the problems described above with respect to standard FIFOs and in addition is able to interface T1 and CEPT protocol communication channels.

Turning now to the drawings, as shown in FIG. 1, a telecommunications FIFO 10 according to the present invention can be used to interface between an incoming serial data signal on transmission line 12 which is connected to a receiver 14, and an outgoing transmission signal on line 16 which is connected to a transmitter 18. Three signals are generated by the receiver 14, including of a write data or WDATA signal on line 20, a write clock or WCLK signal on line 22, and a write frame sync or WFSYNC signal on line 24. These signals are connected as input signals to the FIFO 10. The FIFO 10 produces a read data or RDATA signal on line 26 which is connected as an input to the transmitter 18. A receive clock or RCLK signal from an external circuit (not shown in FIG. 1) on line 28 is connected as an input to the FIFO 10 and the transmitter 18. A second signal from the external source is the receive frame sync or RFSYNC signal on line 30, which is connected as an input to the FIFO 10 and the transmitter 18. In operation, the serial data appearing on line 12 is received by the receiver 14 which analyzes the serial data stream to generate the WDATA signal on line 20, the WCLK signal on line 22, and the WFSYNC signal on line 24 which are presented to the FIFO 10. The FIFO 10 receives the WDATA signal and stores the data in the FIFO at a rate determined by the WCLK signal. As will be shown later, the FIFO 10 also uses the WFSYNC signal on line 24 to determine the frame boundaries of the data coming in on the WDATA line 20. The FIFO 10 also receives the RCLK signal on line 28 and the RFSYNC signal on line 30 to read data out of the FIFO 10. The data read out of the FIFO 10 is placed on the RDATA line 26 and passed to the input of the transmitter 18. The transmitter 18 synchronizes the RDATA signal with the RCLK and the RFSYNC signals to produce a serial data stream which is placed on the transmission line 16.

Significantly, however, the transmission signal on line 16 is synchronized to the RCLK signal appearing on line 28 which is not synchronized with the incoming serial data on transmission line 12. Thus, the FIFO 10 acts to buffer the incoming data from the receiver 14 and hold the data until the transmitter 18 is ready to receive the data. The FIFO 10 must, therefore, be of sufficient length to compensate for short term differences in the clocks of the incoming data on line 12 and the outgoing data on line 16, but yet must not be so long so as to cause unwanted delays between the time data is received at the WDATA input on line 20 until it is output as RDATA on line 26.

In the preferred embodiment, the FIFO 10 has a length of two frames of data, i.e., 386 bits when either receiving or transmitting data with the T1 protocol and 512 bits when receiving and transmitting data with the CEPT protocol. As will be shown below, this length not only fulfills the requirement listed above, but also lends itself to the appropriate slip operation, either re-reading or writing over a previous frame of data without an intervening write or read operation respectively.

Figure 2:
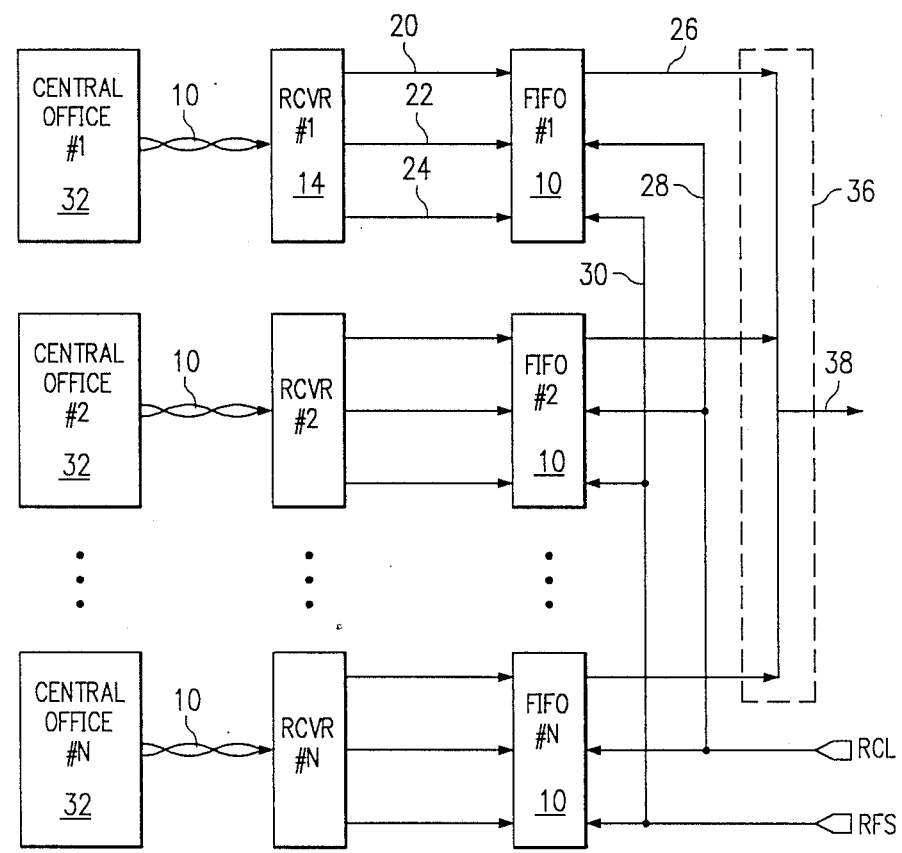
FIG. 2 is a block diagram of a digital transmission multiplexer which includes several telecommunication FIFOs according to the present invention.

The FIFO 10 is also advantageously used in a telecommunication multiplexer as shown, for example, in FIG. 2. In FIG. 2, several central offices 32 each produce a serial data transmission on transmission lines 10 which are connected to receivers 14. The receivers 14 in turn provide WDATA, WCLK, and WFSYNC on lines 20, 22, and 24 respectively to the FIFOs 10. The FIFOs 10 all receive the same RCLK and RFSYNC signals on lines 28 and 30 respectively and the RDATA outputs on lines 26 are multiplexed in a multiplexing circuit 36. The multiplexing circuit 36 selects one of the N outputs from the N FIFOs 10 in response to control lines to the multiplexing circuit 36, which are not shown in FIG. 2. The output of the multiplexing circuit 36 on line 38 is data from one of the N central offices at any particular moment in time.

An important feature of the block diagram of FIG. 2 is that each of the N central offices 32 has its own data clock which is not synchronized with the other N−1 central offices 32. In addition, the incoming frame boundaries indicated by the WFSYNC signal on line 24 may vary greatly between central offices 32, requiring frame rate synchronization by the FIFOs 10. Thus, the customer premise equipment (CPE) which includes the receiver 14, the FIFOs 10, and the multiplexing circuit 36 together with the circuitry to provide the RCLK and RFSYNC signals on lines 28 and 30, must be able to receive and synchronize to each of the N digital data streams appearing on the transmission lines 10. This synchronization is accomplished by the N FIFOs 10 which receive digital data on their WDATA input lines 20 and which provide data on their RDATA output lines 26 which is synchronized to the RCLK and RFSYNC signals on lines 28 and 30 and is, therefore, synchronized with the RDATA outputs 26 of each of the other N−1 FIFOs 10.

Figure 3A:
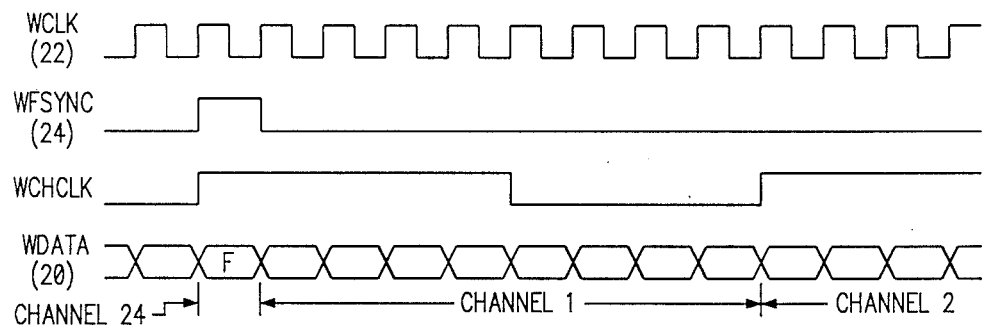
FIGS. 3A-3D is a timing diagram showing some of the signals used in the telecommunications FIFO according to the present invention.
Figure 3B:
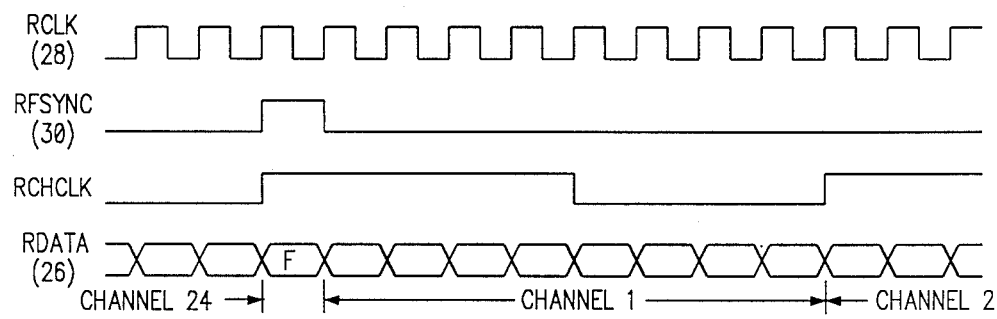

A timing diagram indicating the relative relationships of the signals appearing on lines 20, 22, 24, 26, 28, and 30 is shown in FIGS. 3A, 3B, 3C, and 3D. FIGS. 3A and 3B show the write and read signals respectively of the FIFO 10 when the FIFO 10 is operating according to the T1 protocol. More specifically, FIG. 3A shows the WCLK signal on line 22, the WFSYNC signal on line 24, and the WDATA signal on line 22 together with a fourth signal, write channel clock or WCHCLK, which is generated inside the FIFO 10. As can be seen from FIG. 3A, the WFSYNC signal on line 24 is a positive pulse which has a rising edge that coincides with the rising edge of one of the positive pulses of the WCLK signal on line 22. The WDATA changes on the rising edge of the WCLK pulse and is sampled inside the FIFO 10 on the falling edge of the WCLK pulses. In the T1 protocol, the rising edge of the WFSYNC pulse is coincident with the rising edge of the framing bit shown as F in FIGS. 3A and 3B. Following the framing bit are 8 bits of data which comprise channel 1 followed by the next 23 channels, each consisting of 8 bits of data. After the 8th bit of the 24th channel, another framing bit is received by the FIFO 10 coincident with the WFSYNC pulse. The WCHCLK pulse rises at the channel boundaries and falls between the 4th and 5th bit of each of the channels with the exception of the first channel in which the WCHCLK pulse rises with the framing bit and stays at a high level until the end of the 4th bit of the first channel. FIG. 3B shows a timing pulse relationships for the RCLK signal, the RFSYNC signal, the RDATA signal, and a fourth signal, read channel clock or RCHCLK, which is generated inside the FIFO 10. As can be seen by comparing FIG. 3A with FIG. 3B, the read signals generated by the FIFO 10 have the same timing relationships as the write signals in FIG. 3A.

Figure 3C:
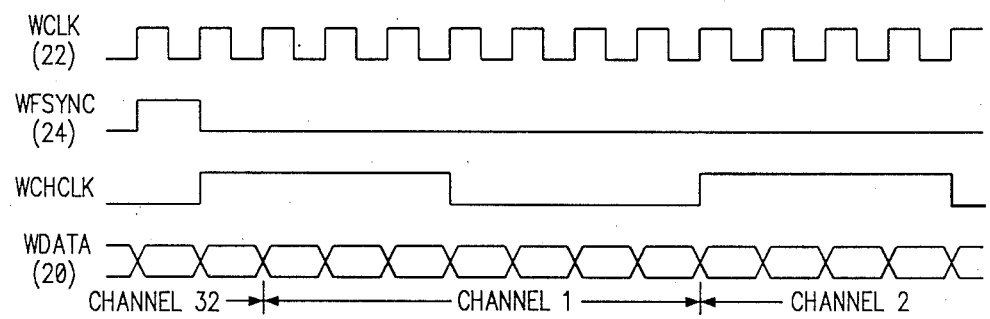
Figure 3D:
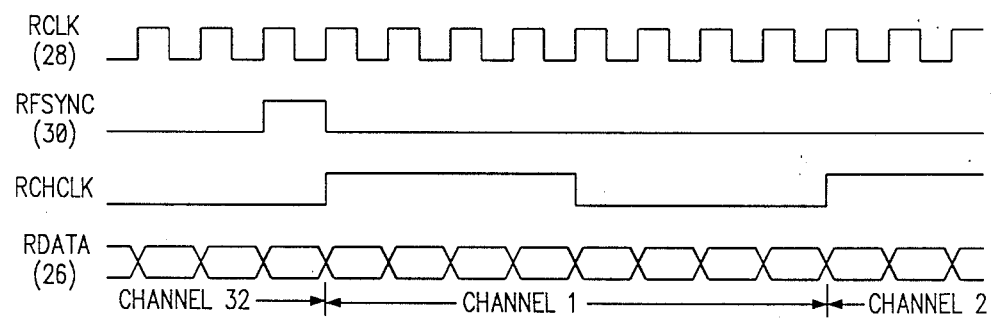

FIGS. 3C and 3D show the write and read signals respectively of the FIFO 10 when operating according to the CEPT protocol. In FIG. 3C the rising edge of the eighth bit of channel 32 of the WDATA on line 22 is coincident with the rising edge of the WFSYNC pulse on line 24 in the convention used in the preferred embodiment of the present invention. The WCHCLK pulse has its rising edge on the channel boundaries and its falling edge between bits 4 and 5 of each channel, but without having an extended pulse at the time of the WFSYNC pulse as with the T1 protocol since an additional framing bit is not added to the 32 channels in the CEPT protocol. As with the T1 protocol signals, the relative timing of the read signals shown in FIG. 3D is the same as the relative relationship of the write signals shown in FIG. 3C.

In FIGS. 3A and 3B, which show the timing relationships for T1 protocol data channels, the WCLK and RCLK period is 1.544 MHz or 5.18 microseconds per channel. In FIGS. 3C and 3D, which show the timing relationships for the CEPT protocol data channels, the WCLK and RCLK operate at 2.048 MHz or 3.91 microseconds per channel. Thus, while the time to transmit a single frame in the T1 protocol is virtually the same as the time to transmit a frame in the CEPT protocol, the actual bit rate in the CEPT protocol is about $\frac{1}{3}$ faster than the bit rate in the T1 protocol. The differences in the number of bits and the bit rate must be compensated for in a T1 protocol to CEPT protocol or CEPT protocol to T1 protocol interface, which the FIFO 10 of the present invention is able to do in a manner to be described below.

FIFO BLOCK DIAGRAM

Figure 4:
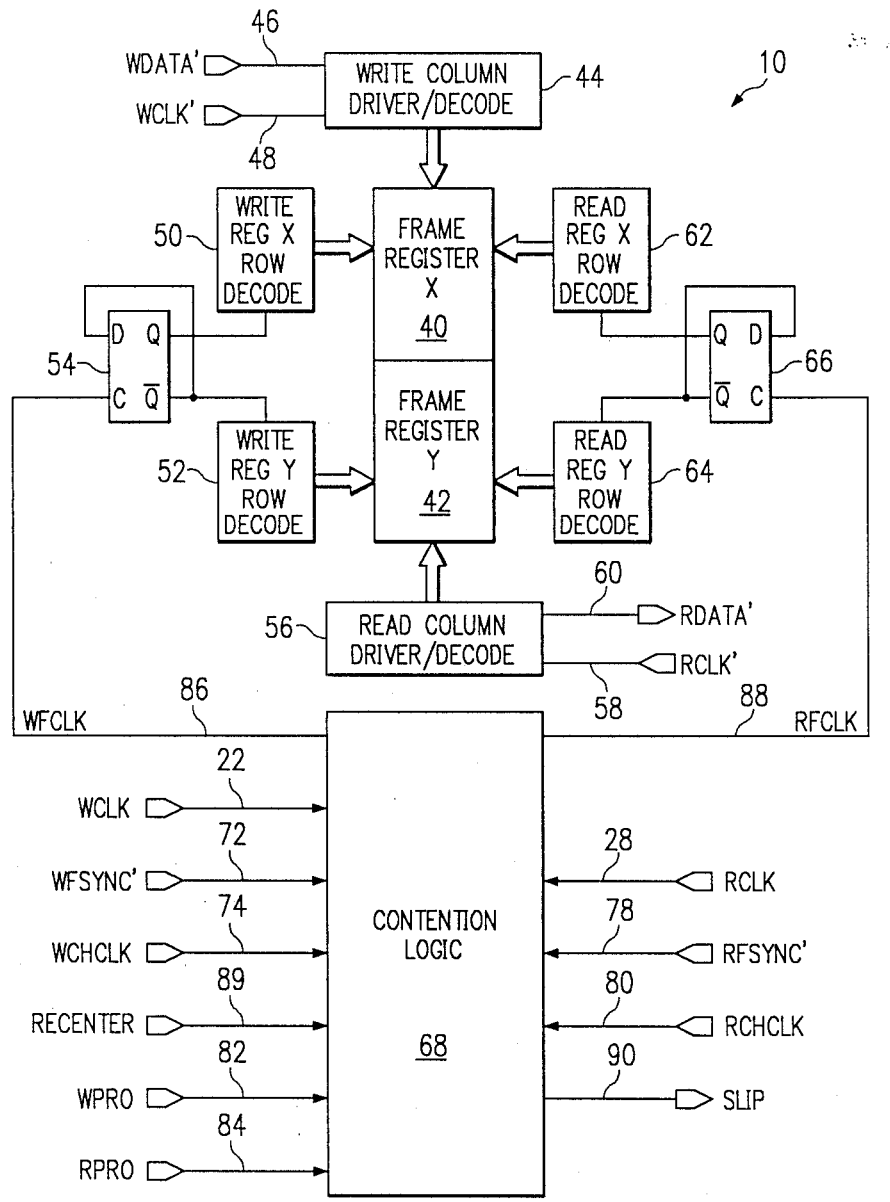
FIG. 4 is a block diagram of a telecommunications FIFO according to the present invention.

Turning now to FIG. 4, a block diagram of the FIFO 10 according to the present invention includes two frame registers, a frame register X shown as element 40 and a frame register Y shown as an element 42. When the FIFO 10 is either receiving data or outputting data according to the T1 protocol, the frame registers X and Y are each 193 bits in length. When the FIFO 10 is both receiving data and outputting data according to the CEPT protocol, then the frame registers X and Y are both 256 bits in length. Thus, the frame registers X and Y form the actual storage cells for the FIFO 10, their length being switchable by circuits not shown in FIG. 4. Connected to both the frame register X and the frame register Y is a write column driver/decode circuit 44 which provides column addressing to each of the 193/256 bits in the frame register X in parallel with the corresponding bits in the frame register Y. The write column driver/decode circuit 44 has two inputs: a WDATA' input on line 46 and a WCLK' input on line 48. On the rising edge of the WCLK' input on line 48, the write column driver/decode circuit 44 increments to the next bit location in the frame register X and the frame register Y; on the corresponding falling edge of the WCLK' signal on line 48, the write column driver/decode circuit 44 puts the logic level present on the WDATA' line 46 onto the column line associated with the addressed bit location in the frame register X and the frame register Y.

Whether the bit on the column selected by the write column driver/decode circuit 44 is written into the frame register X or the frame register Y depends upon the state of the output from a write register X row decode circuit 50 and a write register Y row decode circuit 52. The output of the write register X row decode circuit 50 is connected to the frame register X, and the output of the write register Y row decode circuit 52 is connected to the frame register Y. An input to the write register X row decode circuit 50, which enables or disables the write operation of the write register X row decode circuit 50, is driven by the Q output of a D latch 54. An input to the write register Y row decode circuit 52, which enables or disables the write operation of the write register Y row decode circuit 52, is driven by the $\overline{Q}$ output of the D latch 54. Since the Q and $\overline{Q}$ outputs of the D latch 54 are complementary, only one of the write row decode circuits, either the write register X row decode circuit 50 or the write register Y row decode circuit 52, will be enabled at one time. The data present on the column selected by the write column driver/decode circuit 44 will be written into the frame register X if the write register X row decode circuit 50 is enabled and will be written into the frame register Y if the write register Y row decode circuit 52 is enabled.

A read column driver/decode circuit 56 is connected to both the frame register X and the frame register Y. The read column driver/decode circuit 56 has an input signal RCLK' on line 58. Upon the rising edge of the RCLK' signal on line 58, the read column driver/decode circuit 56 increments to the next bit location in both the frame register X and the frame register Y and transfers the data placed on the column selected to an RDATA' line 60.

Whether the data read in the column selected by the read column driver/decode circuit 56 comes from the frame register X or the frame register Y is determined by the outputs connected to the frame register X and the frame register Y of a read register X row decode circuit 62 and a read register Y row decode circuit 64 respectively. An input to the read register X row decode circuit 62, which enables or disables the read operation of the read register X row decode circuit 62, is provided by the Q output of another D latch 66. An input to the read register Y row decode circuit 64, which enables or disables the read operation of the read register Y row decode circuit 64, is provided by the $\overline{Q}$ output of the D latch 66. Since the Q and $\overline{Q}$ outputs of the D latch 66 are complementary, only one of the read register X row decode circuit 62 or the read register Y row decode circuit 64 will be enabled, and the read row decode circuit so enabled will cause the data stored in the frame register X or the frame register Y corresponding to the columns selected by the read column driver/decode circuit 56 to be transferred to the RDATA' line 60.

The write column driver/decode circuit 44 and its associated write register X row decode circuit 50 and write register Y row decode circuit 52 operate independently of the read column driver/decode circuit 56 and its associated read register X row decode circuit 62 and read register Y row decode circuit 64. Thus, the FIFO 10 is able to write data into the FIFO storage locations in the frame register X and the frame register Y independent of the read operation from the storage locations in the frame register X and the frame register Y.

The $\overline{Q}$ outputs of the D latches 54 and 66 are each connected back to the D inputs of the D latches 54 and 66 and thus the Q and $\overline{Q}$ outputs of the D latches 54 and 56 toggle from one logic state to the other upon the rising edge of a clock pulse appearing at the C input to the D latches 54 and 66.

An important part of the FIFO 10 is the contention logic 68 shown in FIG. 4. The contention logic 68 receives the WCLK input on line 22, a WFSYNC' input on line 72, the WCHCLK input on line 74, the RCLK input on line 28, an RFSYNC' input on line 78, the RCHCLK input on line 80, a WPRO input on line 82, an RPRO input on line 84, and a RECENTER input on line 89. The contention logic 68 has a WFCLK output on line 86 which is connected to the C input of the D latch 54, an RFCLK output on line 88 which is connected to the C input of the D latch 66, and a SLIP output on line 90.

When the FIFO 10 is receiving T1 protocol data and outputting T1 protocol data, then the WCLK' signal on line 48 is the same as the WCLK signal on line 22. Similarly, the WFSYNC' signal on line 72 is the same as the WFSYNC signal on line 24 of FIG. 1 and FIG. 2, the RCLK' signal on line 58 is the same as the RCLK signal line 28, the RFSYNC' signal on line 78 is the same as the RFSYNC signal on line 30 of FIG. 1 and FIG. 2, the WDATA' signal on line 46 is the same as the WDATA signal on line 20 in FIG. 1 and FIG. 2, and the RDATA' signal on line 60 is the same as the RDATA signal on line 26 of FIG. 1 and FIG. 2.

However, additional circuitry is required when the FIFO 10 is interfacing between T1 and CEPT protocol data. When the FIFO 10 is interfacing between T1 protocol data and CEPT protocol data such that the FIFO 10 is receiving data under the T1 protocol and outputting data under the CEPT protocol, then circuitry shown in FIG. 12 and described in detail below is interposed between the RCLK signal on line 28 and the RCLK' signal on line 58, and the RDATA signal on line 26 and the RDATA' signal on line 60.

When the FIFO 10 is interfacing between CEPT protocol data and a T1 protocol data such that the FIFO 10 is receiving data under the CEPT protocol and outputting data under the T1 protocol, then circuitry shown in FIG. 11 and described in detail below is interposed between the WDATA signal on line 20 and the WDATA' signal on line 46, and the WCLK signal on line 22 and the WCLK' signal on line 48.

When the FIFO 10 is receiving CEPT protocol data and outputting CEPT protocol data, then circuitry shown in FIG. 13 and described in detail below is interposed between the WFSYNC signal on line 24 and the WFSYNC' signal on line 72, and the RFSYNC signal on line 30 and the RFSYNC' signal on line 78.

The telecommunication FIFO 10 in the preferred embodiment has an additional feature in which the FIFO 10 enables parallel reading rather than serial reading of the data that it is outputting. The FIFO 10 accomplishes this by outputting the stored data (including the framing bit if applicable) eight bit times early to allow the serial bits on the RDATA line 26 to be shifted into an external serial to parallel converter. To accomplish this parallel capability, additional circuitry shown in FIG. 13 is interposed between the RFSYNC signal on line 24 and the RFSYNC' signal on line 80.

The WPRO signal on line 82 is an input to indicate whether the FIFO 10 is receiving T1 protocol data or CEPT protocol data, and the RPRO signal on line 84 is an input to indicate to the FIFO 10 whether to output T1 protocol data or CEPT protocol data. The SLIP signal on line 90 is an output to indicate to associated external circuitry that the FIFO 10 has performed a slip operation. The RECENTER input on line 89 sets a latch inside the FIFO 10 to command the FIFO 10 to recenter or optimize the distance between the read pointer and the write pointer, an operation which is discussed in more detail below.

FIFO OPERATION

The operation of the telecommunications FIFO 10 shown in FIG. 4 will now be described with reference to the diagram of the FIFO storage locations shown in FIG. 5A and FIG. 5B. FIG. 5A shows symbolically the FIFO storage locations in the frame register X and the frame register Y when the FIFO 10 is configured to store 386 bits of data, and FIG. 5B shows symbolically the storage locations in the frame register X and the frame register Y when the FIFO 1? is configured to store 512 bits of data.

In the normal operation of the FIFO 10 (in which slip operations are not being performed), data received by the FIFO 10 is written sequentially into successive storage locations in either the frame register X or the frame register Y until all of the bit locations in such frame register have been written into, and then the data is directed to the opposite frame register until all the locations in that frame register have been written into, and then data is routed to the first frame register again. In this manner, each frame register is alternatively filled with data. In a similar manner, during a read operation, all of the date in one frame register is read out of the sequential bit locations in that frame register, and then the bit locations of the other frame register are sequentially read out, such that the data in each of the frame registers X and Y is alternatively read.

In FIG. 5A a write pointer 92 is shown pointing to a bit location in channel 21 in the frame register X while a read pointer 94 is shown pointing to a bit location in channel 11 of the frame register Y. Thus at the particular moment in time represented in FIG. 5A, the write pointer 92 and the read pointer 94 indicate that data is being written into one of the 8 bit locations of channel 21 of the frame register X while data is being read from one of the 8 bit locations in channel 11 of the frame register Y. Since the write pointer 92 and the read pointer 94 indicate the write column and row addresses and the read column and row addresses of sequentially addressed storage bit locations, the write and the read pointers move from a left to right direction and switch to the other frame register after completing channel 24 of its respective register. This transition from the end of the frame register X to the beginning of the frame register Y is shown as dotted line 96, and the transition from the end of the frame register Y to the beginning of the frame register X is shown as dotted line 98.

The transition between the two frame registers is controlled by the D latch 54 and the D latch 66. As stated previously, the D latch 54 operates to select the frame register X or the frame register Y for write operations and the D latch 66 operates to select the frame register X or the frame register Y for read operations. Since the signal connected to the C input of the D latches 54 and 66 causes these D latches to change state and thus the particular frame register being written into or read from respectively, the signal at the C inputs causes the transitions shown by dotted lines 96 and 98 in FIG. 5A.

Advantageously, in the preferred embodiment, the switch between the frame registers both in writing data into the FIFO 10 and reading data from the FIFO 10 occurs on the rising edge of the WFSYNC' signal on line 72 and the RFSYNC' signal on line 78 respectively. Thus when the FIFO 10 is receiving and outputting T1 protocol data, the first bit written into each of the frame registers X and Y and the first bit read from the frame registers X and Y following a transition from one frame register to the other is a framing bit shown as elements 100 and 102 respectively in FIG. 5A.

More particularly, as shown in FIG. 5A, the write pointer 92 will increment to the next sequential bit locations as sequential bits of data are received by the FIFO 10 until the write pointer 92 is addressing bit location 8 of channel 24. Coincident with the arrival of the next WCLK' pulse on line 48 will be the WFSYNC' pulse on line 72. Upon the rising edge of the WFSYNC' pulse under normal conditions, the contention logic 68 will send a rising edge of a clock pulse to the C input of D latch 54 to cause the Q and $\bar{Q}$ outputs of the D latch 54 to change state which will cause the next data bit appearing on the WDATA' line 46 to be written into the frame bit location 102 of the frame register Y. The write pointer will then continue to progress through the frame register Y until it is at bit location 8 of channel 24 on the frame register Y. At this time the next WCLK' signal will be coincident with the next WFSYNC' signal, which will cause the contention logic 68 to toggle the D latch 54 to cause the next data bit written into the FIFO 10 to be written in the frame bit location 100 of the frame register X.

In exactly the same manner, data is read sequentially from the frame register X and the frame register Y as the read pointer 94 switches from one frame register to the other coincident with the rising edge of the RFSYNC' pulse appearing on the line 78. Thus the RFSYNC' pulse on line 78, under normal conditions, causes the D latch 66 to toggle.

When the FIFO 10 is receiving and outputting CEPT protocol data, then the operation of the read pointer and the write pointer described with respect to FIG. 5A operates in the same manner as shown in FIG. 5B except, as described above, the frame registers X and Y are 32 channels long, but do not have an additional bit location for a framing pulse. In order to position the RFSYNC' pulse and the WFSYNC' pulse coincident with the first bit of each frame of data, the RFSYNC signal and WFSYNC signal are delayed one clock period of the RCLK signal and the WCLK signal respectively (by circuitry shown in FIG. 13) to form the RFSYNC' signal and the WFSYNC' signal respectively when the FIFO 10 is receiving and outputting CEPT protocol data.

SLIP OPERATION

As state above, a slip operation results in either the rewriting of a frame of data before the previous frame has been read, or the rereading of a frame of data before the previous data has been overwritten. An important feature of the present invention is that a slip operation is accomplished in the FIFO 10 simply by suppressing the clock signal to the D latch 54 or the D latch 66 at the normal time in which it would occur, i.e., at the arrival of the WFSYNC' signal or the RFSYNC' signal respectively. For example, if upon arrival of the WFSYNC' signal the write pointer 92 is in the frame register X, but the signal to toggle the D latch 54 is suppressed, then the next data bit will be written into the framing bit location 100 of the frame register X. And thus at least some of the bits in the frame register X would be rewritten before they are read out by the read pointer 94. Similarly, if the read pointer 94 is addressing bit 8 of channel 24 of the frame register Y and, upon receipt of the next RFSYNC' signal, the clock signal to the D latch 66 is suppressed, then the next bit location read will be the framing bit location 102 of the frame register Y. Then at least some of the bits stored in the frame register Y will be read twice without an intervening write operation. The operation is shown by the dashed lines 103 and 104 in FIG. 5A. Thus the telecommunications FIFO 10, according to the present invention, is able to simply and efficiently perform this slip operation.

As described above, the slip operation is invoked whenever the FIFO 10 is about to become empty or is about to become full. With reference to FIG. 5A and as example of an impending empty FIFO condition, assume the read pointer 94 is in channel 1 of the frame register Y shown by the dashed read pointer 105 and assume the write pointer 92 is in bit location 8 of channel 24 also shown by the dashed write pointer 106. If upon the receipt of then next WFSYNC' pulse, a slip operation did not occur, i.e., the D latch 54 is toggled, then the write pointer 106 would be equal to or less than one channels width away from the read pointer 105 and might shortly overtake the read pointer 105 to cause a full FIFO condition. If, however, upon the arrival of the WFSYNC' pulse, the clock signal to the D latch 54 is inhibited, then the write pointer 106 would not switch to the frame register Y but would return to framing bit 100 of the frame register X.

At this point in time almost a full frame register would separate the write pointer 106 and the read pointer 105 resulting in a half-full FIFO condition. This half-full FIFO condition is the preferred operating condition since it allows the maximum positive or negative differential tolerance in the clock rates of the RCLK signal and the WCLK signal. This half-full condition is also referred to as a centered FIFO. The term "recentered" as used herein will refer to a condition in which one of the pointers is slipped to increase the minimum distance to the other pointer. However, it is not always possible to recenter the FIFO 10. For example, as shown in FIG. 5A, it is not possible to recenter or further separate the write pointer 92 from the read pointer 94 since if the write pointer 92 were in channel 21 of the Y register, the write pointer 92 and the read pointer 94 would be separated by approximately 11 channels of data, as opposed to the location of the write pointer 92 and read pointer 94 shown in FIG. 5A in which two pointers have a minimum separation of approximately 14 channels of data.

SLIP CRITERIA

Since the slip operation is invoked to avoid a full FIFO or an empty FIFO condition, i.e. when the write pointer 92 and the read pointer 94 are both addressing the same bit location in the same register, the FIFO 10 contains circuitry to anticipate an approaching overlap of the write pointer 92 and the read pointer 94. The FIFO 10 also is capable of performing a recenter operation, if appropriate, upon the receipt of a RECENTER signal on line 89. The criteria for each of these slip conditions is as follows:

Since a slip operation can only occur at the frame boundaries, it is necessary to anticipate if the two pointers, the write pointer 92 and the read pointer 94, are sufficiently close to each other such that the two pointers may coincide during the writing or reading of the next frame of data. Moreover, since the slip operation can only occur when a WFSYNC' pulse arrives (for a rewrite slip operation) or a RFSYNC' pulse arrives (for a reread slip operation), the determination of whether the write pointer and the read pointer are too close to each other need only be made at the time the decision is made whether to switch from one frame register to the other, i.e. upon the receipt of a WFSYNC' pulse or a RFSYNC' pulse. Thus the FIFO 10, upon the receipt of each of the WFSYNC' pulses and the RFSYNC' pulses, determines if the two pointers are close enough to each other to warrant a rewrite or reread slip operation respectively.

Figure 6A:
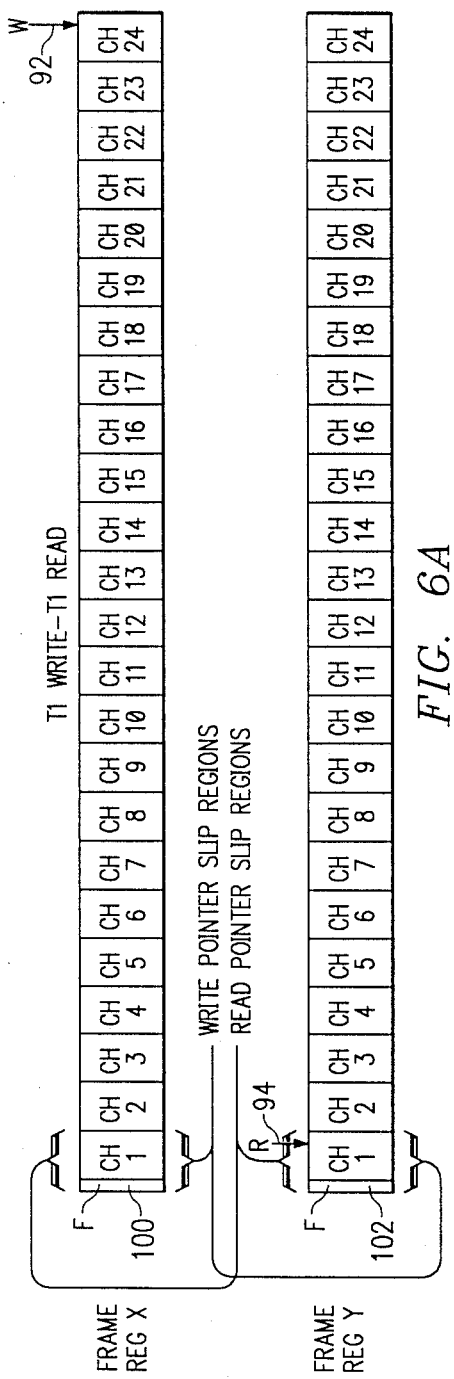

The criteria for determining whether the write pointer 92 and the read pointer 94 are close enough to each other to warrant a slip operation is as follows:

Turning now to FIG. 6A, the slip criteria for a FIFO 10 receiving T1 protocol data and outputting T1 protocol data is to perform a slip operation if the read pointer 94 is addressing the frame bit position or addressing a bit position of channel 1 of the opposite frame register of the frame register being addressed by the write pointer 92 when the write sync framing pulse, WFSYNC', is received. For example, as shown in FIG. 6A, the write pointer 92 is in bit position 8 of channel 24 of the frame register X and the read pointer 94 is in one of the bit positions of channel 1 when the write sync pulse is received. Under these conditions a rewrite slip operation will occur. That is, the clock pulse to the D latch 54 will be inhibited and thus the write pointer 92 will move to the framing bit location 100 of the frame register X. Similarly, a reread slip operation will occur if the write pointer 94 is addressing the frame bit position or addressing a bit position of channel 1 of the opposite frame register of the frame register being addressed by the read pointer 94 when the read sync pulse, RFSYNC', is received. For example if the read pointer 94 is at bit location 8 of channel 24 of the frame register X and the write pointer 92 is in the framing bit location 100 or in channel 1 of the frame register X when a RFSYNC' pulse occurs, then a slip operation will occur.

The slip criteria, that the two pointers are within 9 bit locations of each other when a framing sync pulse occurs, was derived taking into account the allowed frequency variation in the T1 specification for the clock data rate and the time required for one frame of data to be read into or read out of the FIFO 10. Stated another way, if the two pointers are separated by more than 9 bit locations, and if the two clocks, the write clock and the read clock, are within the T1 specification, then the two pointers should not overlap prior to the receipt of the next WFSYNC' and RFSYNC' signals.

Figure 6B:
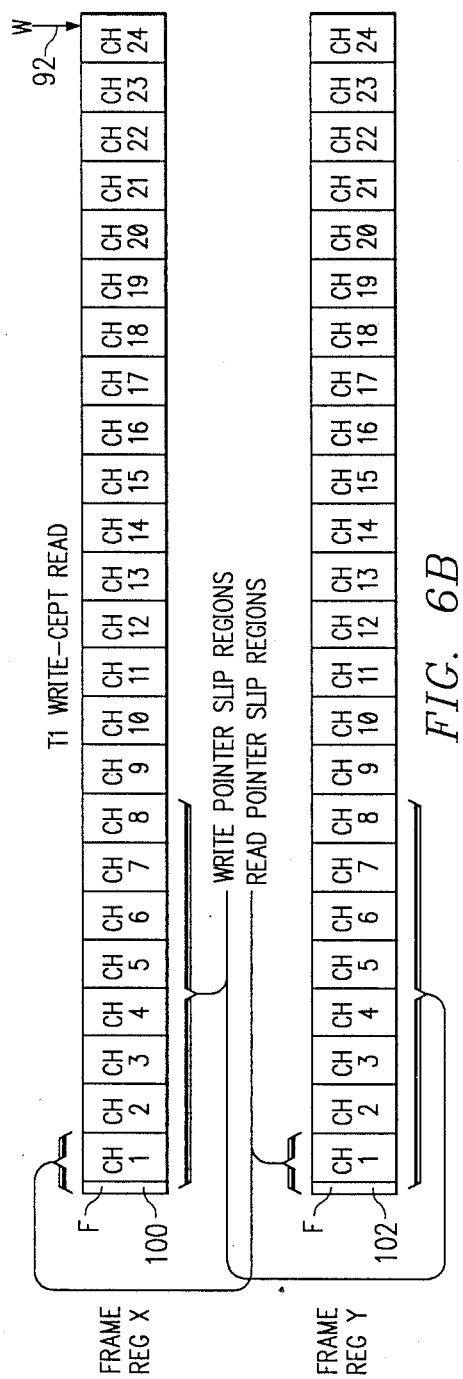

Turning now to FIG. 6B, the slip criteria is different when the telecommunications FIFO 10 is receiving data according to the T1 protocol but outputting data according to the CEPT protocol. Since the bit rate of the CEPT protocol is approximately a third faster than the T1 protocol, the read pointer 94 moves approximately a third faster than the write pointer 92 until it reaches the end of the frame register X or the frame register Y. When the read pointer 94 reaches the end of the frame register X or the frame register Y, the RCLK' signal pulses on line 58 to the read column driver/decoder 56 are suppressed until receipt of the next RFSYNC' pulse on line 78. Stated another way, the read pointer 94 progresses through the frame register X or the frame register Y at a rate approximately a third faster than the write pointer 92, but the read pointer 94 stops after reading the 8th bit from channel 24 until the write pointer 92 completes writing the 193rd bit after the read pointer 94 began reading data after the previous RFSYNC' pulse was received. Thus the time between the write frame sync pulses and the read frame sync pulses are the same, but the relative speed of the pointers is different.

Since the read pointer 94, when reading bits from the FIFO 10, is moving faster than the write pointer 92, the slip criteria for a T1 protocol input and a CEPT protocol output is that a reread slip operation will be enabled if the RFSYNC' signal on line 78 is received while the write pointer 92 is in the framing bit position or in any of the first 8 channels of the opposite frame register of the read pointer 94. For example, if a RFSYNC' pulse occurs when the read pointer 94 is in the frame register Y and the write pointer 92 is in channel 8 of the frame register X, then the contention logic 68 will inhibit the clock signal to the D latch 66 which will cause a reread slip operation. The criteria for a rewrite slip operation relative to the write pointer 92 is the same as for the T1 protocol input and T1 protocol output condition. That is, if the read pointer 94 is in the frame bit position or in channel 1 of the frame register opposite to the frame register of the write pointer 92 when the WFSYNC' pulse occurs, then a rewrite slip operation will occur.

Figure 6C:
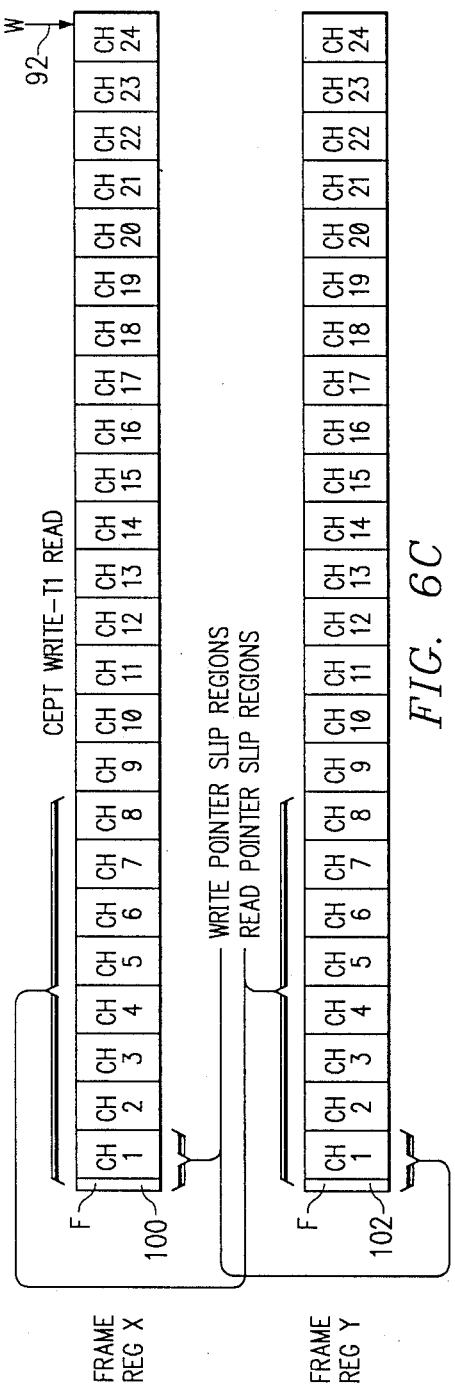
Figure 6D:
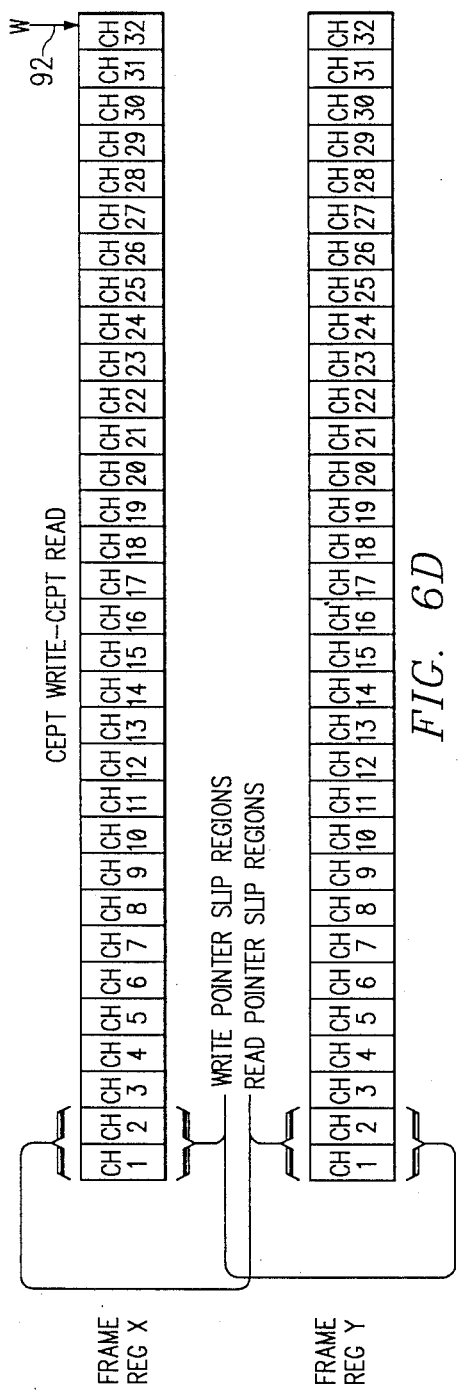

Analogously, if the telecommunications FIFO 10 is receiving data encoded according to the CEPT protocol and outputting data according to the T1 protocol, then the write pointer 92 will be moving approximately a third faster than the read pointer 94 until it reaches the end of the frame register X or Y and at that point will suspend writing until the receipt of a WFSYNC' pulse on line 72. Thus, as shown in FIG. 6C, the criteria for a rewrite slip operation when a WFSYNC' pulse is received is that the read pointer 94 is in the framing bit location or in the first 8 channels of the opposite frame register of the write pointer 92. Also the reread slip criteria when an RFSYNC' pulse occurs is that the write pointer 92 is in the framing bit position or channel 1 of the opposite frame register of the read pointer 94.

The slip criteria when the telecommunications FIFO 10 is receiving and outputting data according to the CEPT protocol is shown in 6D. Since the write pointer 92 and the read pointer 94 are moving faster than if the FIFO 10 was receiving and outputting T1 protocol data, 9 bits is not an adequate range to anticipate a collision. Rather two channels or 16 bits are tested upon the receipt of either a WFSYNC' or RFSYNC' signal in order to determine if a slip operation is to be initiated. For example, if the write pointer 92 is the frame register X, then upon the next receipt of a WFSYNC' signal, a reread slip operation will occur if the read pointer 94 is in either channel 1 or channel 2 of the frame register Y.

In addition to the criteria described above, the contention logic 68 also contains circuitry for detecting if the write pointer 92 and the read pointer 94 are in the same channel of the same register when the RFSYNC' signal appears on line 78. In other words a slip operation will occur if the write pointer 92 is in the last channel of the same register as the read pointer 94 at the time of a RFSYNC' signal on line 78. This same channel detection circuitry is used mainly during power-up or during the initial application of external timing signals to the FIFO 10. The choice of performing a same channel slip operation at the time of the RFSYNC' signal (for a reread slip operation) is essentially arbitrary; the same channel slip operation could also be performed upon receipt of the WFSYNC' signal (for a rewrite slip operation).

RECENTER

In addition to the contention avoidance slip operation and the same channel slip operation described above, the FIFO 10 also has the capability to recenter or optimize the position of the write pointer 92 with respect to read pointer 94 by performing a recenter slip operation. Upon application of a RECENTER signal to the contention logic 68, the contention logic 68 waits until the next occurrence of the RFSYNC' pulse on line 78 and then determines if the write pointer 92 is in a position in which a reread slip operation would be advantageous to optimize the positions of the write pointer 92 and the read pointer 94. If the contention logic determines that the write pointer 92 is not in position in which a slip operation would be advantageous as described above, then the FIFO operates normally and the latch which was originally set by the RECENTER command is reset. The choice of recentering the FIFO 10 at the time of the RFSYNC' signal (for a reread slip operation) is essentially arbitrary; the recenter operation could also be performed upon receipt of the WFSYNC' signal (for a rewrite slip operation).

FIG. 7 shows the criteria used when a recenter command is received as to whether to perform a recenter slip operation or not. FIG. 7A shows the frame register X and the frame register Y and the criteria used when the T1 protocol data is being received by the FIFO 10 and being output by the FIFO 10. Under these conditions, a recenter slip operation would be performed when the read pointer 94 is less than 12 channel locations away from the write pointer 92. For example, as shown in FIG. 7A, when the RFSYNC' pulse is received by the FIFO 10 while the read pointer 94 is in the frame register X following a recenter command, a recenter slip operation will occur if the write pointer 92 is in the channels 13–24 of the frame register X or in the frame bit position 102 of the frame register Y or in any of the first 12 channels of the frame register Y. If the write pointer 92 is not in any of these positions, a recenter slip operation will not be performed and the RECENTER command will be ignored.

FIG. 7B shows the criteria for recentering when T1 protocol data is being received by the FIFO 10 and CEPT protocol data is being output from the FIFO 10. Under these conditions, a recenter slip operation will occur when a RFSYNC' pulse if received by the FIFO 10 on line 78 and the write pointer 92 is in channels 17–24 of the same frame register or in the framing bit of the opposite frame register or channels 1–16 of the opposite register. For example, as shown in FIG. 7B, if a RFSYNC' signal is received while the read pointer 94 is in the frame register X following a recenter command, a recenter slip operation will occur if the write pointer 92 is in the 17th through 24th channels of the frame register X or in the frame bit position 102 of the frame register Y, or channels 1–16 of the frame register Y.

Similarly, with respect to the operation of the FIFO 10 in which CEPT protocol data is written into the FIFO 10 and T1 protocol data is output from the FIFO 10, the FIFO 10 will perform a recenter slip operation if a recenter command is received and at the time that the next RFSYNC' signal on line 78 goes high, the write pointer 92 is in channels 13–24 of the same frame register as the read pointer 94 or the write pointer 92 is in the framing bit position or channels 1–12 of the opposite register. For example, as shown in FIG. 7C, when the read pointer 94 is in the frame register X at the time that the RFSYNC' pulse is received following a recenter command, a recenter slip operation will be performed if the write pointer 92 in channels 13–24 of the frame register X or in the frame bit position 102 of the frame register Y, or in channels 13–24 of the frame register Y.

Finally, when the FIFO 10 is receiving and outputting CEPT protocol data, a recenter command will cause a recenter slip condition at the arrival of the next RFSYNC' prime pulse on line 78 if the write pointer 92 at that time is in channels 1-16 of the opposite frame register as the location of the read pointer 94, or is in channels 17-32 of the same frame register as the read pointer 94. An example is shown in FIG. 7D in which the read pointer 94 is in the frame register X when a RFSYNC' signal is applied to line 72 following a recenter command. A recenter slip operation will be performed if the write pointer 92 at that time is in channels 17-32 of the frame register X or is in channels 1-16 of the frame register Y.

CONTENTION LOGIC

Figure 8:
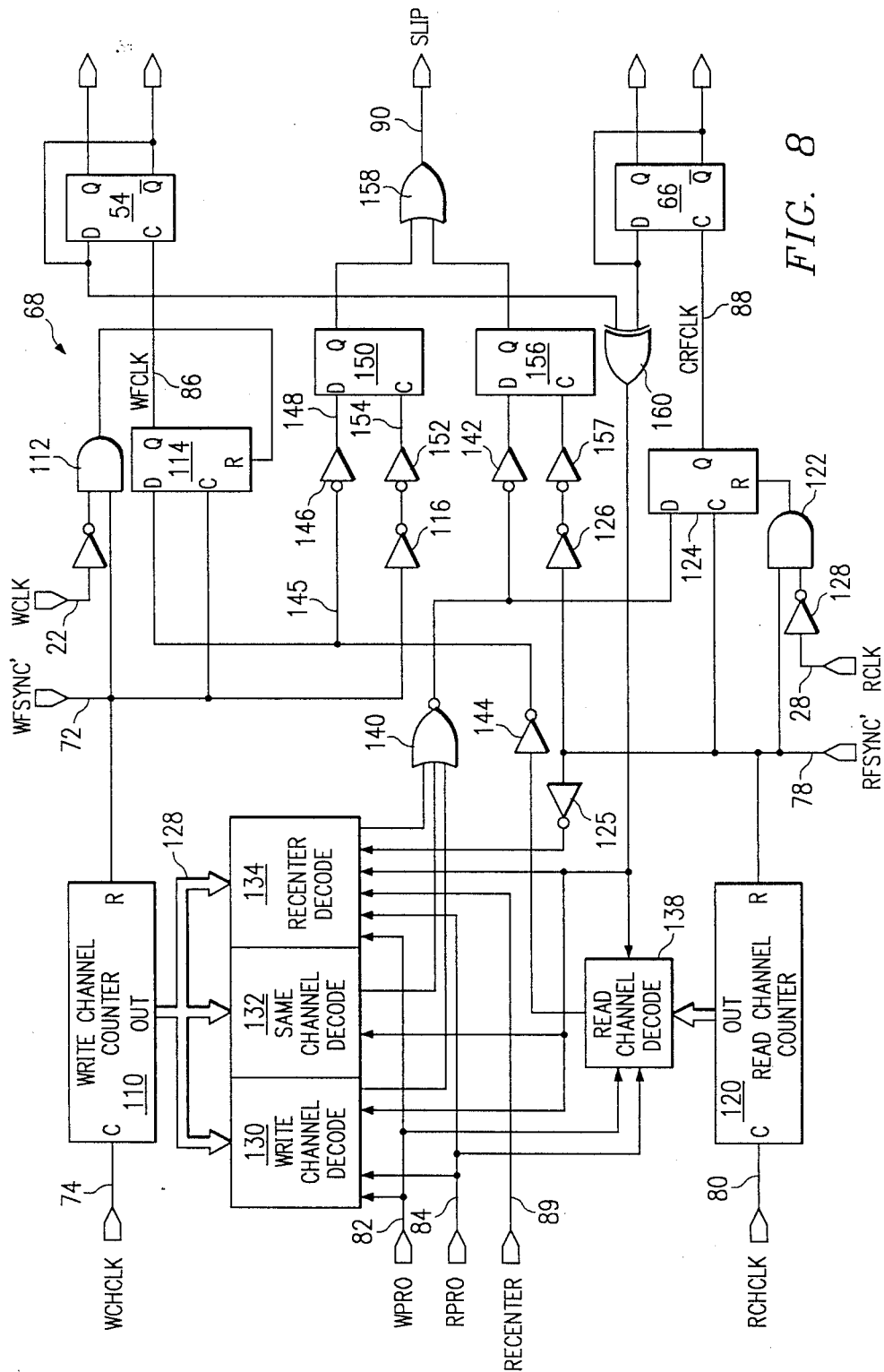
FIG. 8 is a logic diagram of the contention logic shown in the block diagram of FIG. 4.

A logic diagram for the contention logic block 68 shown in FIG. 4 is shown in FIG. 8. The WCHCLK signal on line 74 is connected to the clock input of a counter circuit 110 labeled WRITE CHANNEL COUNTER. The WFSYNC' signal on line 72 is connected to a reset input of the write channel counter 110, to one input of an AND gate 112, to the clock input of a D latch 114 and to the input of an inverter 116. The WCLK signal on line 72 is connected to an input of an inverter 118, the output of which is connected to a second input of the AND gate 112. The output of the AND gate 112 is connected to a reset input of the D latch 114. The Q output of the D latch 114 is connected to the WCLK line 86 which in turn is connected to the C input of the D latch 54 also shown in FIG. 4. The RCHCLK input on line 80 is connected to the clock input of a second counter 120 labeled READ CHANNEL COUNTER in FIG. 8. The RFSYNC' signal on line 78 is connected to a reset input of the read channel counter 120, to one input of an AND gate 122, to the clock input of another D latch 124, to the input of an inverter 125, and to input of another inverter 126. The RCLK signal on line 28 is connected to the input of an inverter 128, the output of which is connected to the second input of the AND gate 122. The output of the AND gate 122 is connected to the reset input of the D latch 124. The Q output of the D latch 124 is connected to the RCLK line 88 which in turn is connected to the clock input of the D latch 66 also shown in FIG. 4.

The output of the write channel counter 110 is connected to a bus 128 which in turn forms an input to three decode circuits, a write channel decode circuit 130, a same channel decode circuit 132, and a recenter decode circuit 134. The output of the read channel counter 120 is connected to another bus 136 which in turn forms the input to a read channel decode circuit 138. The WPRO signal on line 82 is connected as an input to the write channel decode circuit 130, to the read channel decode circuit 138 and to the recenter decode circuit 134. The RPRO signal on line 84 is connected as an input to the write channel decode circuit 130, to the read channel decode circuit 138 and to the recenter decode circuit 134. The RECENTER signal on line 89 is connected as an input to the recenter decode circuit 134. The output of the inverter 125 is connected as an input to the recenter decode circuit 134. The output of the write channel decode circuit 130 is connected to a first input of a NOR gate 140. The output of the same channel decode circuit 132 is connected to a second input of the NOR gate 140 and the output of the recenter decode circuit 134 is connected to a third input of the NOR gate 140.

The output of the NOR gate 140 is connected to the input of an inverter 142 and to the D input of the D latch 142. An output of the read channel decode circuit 138 is connected to the input of an inverter 144, the output of which forms a node 145 which is connected to the input of another inverter 146 and to the D input of the D latch 114. The output of inverter 146 at node 148 is connected to the D input of another D latch 150. The output of the inverter 116 is connected to the input of another inverter 152, the output of which is connected to a node 154 at the clock input of the D latch 150. The output of the inverter 142 is connected to the D input of another D latch 156. The output of the inverter 126 is connected to the input of another inverter 157, the output of which is connected to the clock input of the D latch 156. The Q output of the D latch 156 is connected to one input of an OR gate 158 and the Q output of the D latch 150 is connected to a second input of the OR gate 158. The output of the OR gate 158 is connected to line 90 which is the SLIP signal out of the contention logic 68. A Q output of the D latch 54 is connected to one input of an exclusive OR gate 160. The Q output of the D latch 66 is connected to a second input of the exclusive OR gate 160. The output of the exclusive OR gate 160 is connected as an input to the read channel decode circuit 138, to the recenter decode circuit 134, to the same channel decode circuit 132, and to the write channel decode circuit 130.

CONTENTION LOGIC OPERATION

The operation of the logic circuit shown in FIG. 8 controls the operation of the D latches 54 and 66 to select the frame register X or the frame register Y during read and write operations, to decode the position of the write pointer 92 and the read pointer 94 and to test the position of these pointers at the occurrence of the RFSYNC' and the WFSYNC' pulses respectively, and to slip the data in the frame register X or the frame register Y if one of the criteria listed above has been met.

More specifically, the write channel counter 110 is clocked by the WCHCLK signal on line 74 and provides at its output signals indicating the state of the write channel counter 110. The write channel counter 110 is reset by the WFSYNC' signal on line 72. Thus, the output of the write channel counter 110 indicates in which channel the write pointer 92 is located, but not which bit position in the channel. The write channel decode circuit 130 receives inputs from the WPRO and RPRO signals which indicate if the FIFO 10 is receiving T1 or CEPT protocol data and if the FIFO 10 is outputting T1 or CEPT protocol data. The write channel decode circuit 130 also receives the output from the exclusive OR gate 160 which indicates whether the write pointer 92 and the read pointer 94 are in the same channel or in opposite channels. The write channel decode 130 combines these inputs and provides a signal to the input of the NOR gate 140 which is high when the write pointer 92 is in one of the channel locations which would cause a slip operation if the RFSYNC' pulse were to occur at that time. For example, if the FIFO 10 were receiving and outputting T1 protocol data and the write pointer 92 and the read pointer 94 were in opposite frame registers, then the write channel decode circuit 130 would output a logic 1 level during the time that the write pointer 92 was in the frame bit location or in the channel 1 position and would output a logic 0 level when the write pointer 92 was in channels 2-24 or when the write pointer 92 and the read pointer 94 were in the same register.

The same channel decode circuit 132 receives an output from the exclusive OR gate 160 indicating whether the write pointer 92 and the read pointer 94 are in the same frame register or opposite frame registers. If the same channel decode circuit 132 detects that the write pointer 92 is in the last channel of a frame register and that the read pointer 94 is in the same register, then it places a logic 1 level on its output which forms the second input to the NOR gate 140.

The recenter decode circuit 134 receives the recenter signal input on line 89, along with WPRO and RPRO inputs on lines 82 and 84 and the output from the exclusive OR gate 160. Upon receipt of a recenter signal on line 89, a latch inside the recenter decode circuit 134 is set and the output of the recenter decode circuit 134 provides a logic 1 level during the time the write pointer is in a position to cause a slip operation if an RFSYNC' pulse were to occur during that time, and provides a logic 0 level at other times until the receipt of a signal from inverter 125 which resets the latch inside the recenter decode circuit 134. When the latch inside the recenter decode circuit 134 is reset, the output of the recenter decode circuit 134 goes to a logic 0 level.

At least one of the three inputs to the NOR gate 140 are high at any time when a slip operation should occur were the RFSYNC' pulse to arrive at that time. The output of the NOR gate 140 is high (logic 1 level) when a slip would not occur were the RFSYNC' pulse to arrive at that time and is low (logic 0 level) when a slip operation is to occur were the RFSYNC' pulse to occur at that time. Since normal slip operations do not occur, the output of the NOR gate 140 is normally high when the RFSYNC' pulse appears on line 78. Thus, the D input to the D latch 124 is high normally when the D latch 124 is clocked by the RFSYNC' signal on line 78. At this time the Q output of the D latch 124 goes to a logic 1 level and stays at that level until the next falling edge of the RCLK signal on line 28. At that time, the output of the inverter 128 becomes positive and the output of the AND gate 122 goes to a logic 1 level to reset the D latch 124 which in turn causes the Q output of D latch 124 to fall. Thus, the arrival of the RFSYNC' pulse on line 78 under normal operations causes the Q output of the D latch 124 to go positive to in turn clock the D latch 66 which causes the Q and $\overline{Q}$ outputs of the D latch 66 to toggle to therefore cause the read pointer 94 to change to the opposite register.

Operating in parallel with the D latch 124 is the D latch 156. Under normal conditions, the output of the NOR gate 140 is a logic 1 level which is inverted by the inverter 142 to provide a logic 0 level into the D input of the D latch 156. The RFSYNC' pulse on line 78 is inverted twice by the inverters 126 and 157 to drive the clock input of the D latch 156. The Q output of the D latch 156 thus indicates the inverse of the state of the output of the NOR gate 140 at the previous RFSYNC' pulse time. The output of the D latch 156 is ORed with the output of the D latch 150 to indicate on line 90 whether a slip condition has occurred. The inverters 126 and 157 are added to provide a delay in the operation of the D latch 156 with respect to the operation of the D latch 124 to compensate for the delay in the inverter 142 and thus to help avoid a false slip or non-slip signal.

In an operation similar to the operation of the write channel counter 110 and the write channel decode circuit 130, the read channel counter 120 provides at its outputs on bus 136 an indication of the channel position of the read pointer 94, but not which bit position in the channel. The read channel decode circuit 138 receives the WPRO and RPRO inputs to indicate which protocol is being written into the FIFO 10 and being output by the FIFO 10. The read channel decode circuit 138 also receives the output of the exclusive OR gate 160 which indicates whether the write pointer 92 and the read pointer 94 are in the same frame register or opposite frame registers. The read channel decode circuit 138 provides an output which indicates that a slip operation should or should not occur were a WFSYNC' signal to occur at that time. For example, if the FIFO 10 were receiving and outputting T1 protocol data and the write pointer 92 and the read pointer 94 were in the opposite frame registers, the output of the read channel decoder 138 would be a logic 1 level when the read pointer 94 was in the frame bit position or in the first channel. The output of the read channel decoder 138 would be a logic 0 level at all other times under this example.

The output of the read channel decoder 138 is inverted by the inverter 144 which provides the D input to the D latch 114. The D latch 114 operates in the same manner as the D latch 124. Under normal conditions the D input to the D latch 114 is normally high when the WFSYNC' pulse occurs at line 72 to thus drive the Q output of the D latch 114 to a logic 1 level. Upon the next logic 0 level of the WCLK signal on line 22, the output of the AND gate 112 becomes a logic 1 level which causes the D latch 114 to reset which pulls the Q output of the D latch 114 to a logic 0 level. This positive pulse, which has a rising edge occurring essentially at the same time as the rising edge of the WFSYNC' pulse, toggles the D latch 54 which in turn changes the position of the write pointer 92 from one frame register to the other frame register.

Operating in parallel with the D latch 114 is the D latch 150. Under normal conditions, the output of the inverter 146 is a logic 1 level which is inverted by the inverter 142 to provide a logic 0 level into the D input of the D latch 154. The WFSYNC' pulse on line 72 is inverted twice by the inverters 116 and 152 to drive the clock input of the D latch 150. The Q output of the D latch 150 thus indicates the inverse of the state of the output of the inverter 144 at the previous WFSYNC' pulse time. The output of the D latch 150 is ORed with the output of the D latch 156 to indicate on line 90 whether a slip condition has occurred. The inverters 116 and 152 are added to provide a delay in the operation of the D latch 150 with respect to the operation of the D latch 114 to compensate for the delay in the inverter 146 and thus to help avoid a false slip or non-slip signal.

Figures 9A, 9B:
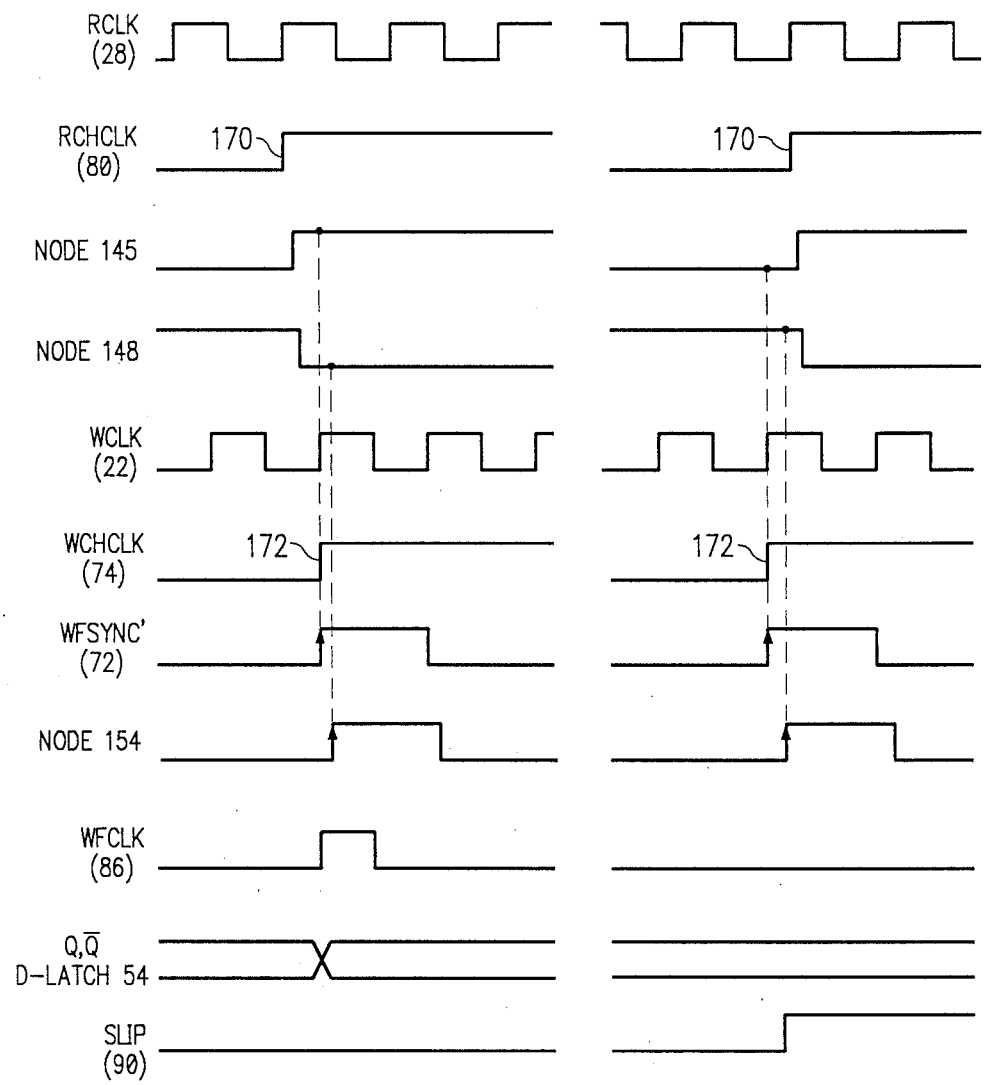
FIGS. 9A and 9B is a timing diagram showing some of the logic signals present in the logic diagram of FIG. 8.

FIG. 9A and FIG. 9B are timing diagrams for selected signals in the block diagram of FIG. 8 showing an example of a normal operation (FIG. 9A) and for a slip operation (FIG. 9B). In this example the FIFO 10 is reading and outputting T1 protocol data. In both FIG. 9A and 9B the rising edge of the RCHCLK signal (shown as reference number 170) indicates that the read pointer 94 has changed from one channel to the next channel at the time of the rising edge 170. The signal indicated as node 145 is also rising at that time indicating that the read channel decode circuit 138 has switched from a condition to initiate a slip operation to condition which will not initiate a slip operation when the RCHCLK signal made the transition shown at 170. The rising edge of the signal at node 145 occurs in this example when the read pointer 94 is changing from channel 1 to channel 2 of the opposite frame register to the frame register being currently written into.

The WCLK signal on line 22 is shown in FIG. 9A and 9B and is not synchronized to the RCLK signal on line 28. A WCHCLK signal on line 74 has a rising edge indicated by reference number 172 which indicates that the write pointer 92 is changing from one channel to a next channel. The WFSYNC' pulse on line 72 is also rising at the same time as the rising edge 72 which indicates that the write pointer 92 is in bit position 8 of the last channel of the current frame and is about to enter the framing bit position of the same frame register or the opposite frame register depending on whether or not a slip operation occurs.

As described above, it is at this time when the WFSYNC' pulse is rising that the signal level on node 145 is clocked into the D latch 114. Also shown in FIGS. 9A and 9B is node 154 which is the WFSYNC' signal after it has been inverted twice. The rising edge of the node 154 signal is used to clock the logic level on node 148 into the D latch 150.

In FIG. 9A, the rising edge of the WFSYNC' pulse occurs when node 145 is high and thus the output of D latch 114, signal WFCLK, changes to a logic 1 level as shown in the WFCLK (86) waveform. The WFCLK signal at node 86 remains at a logic 1 level until the D latch 114 is reset, which occurs on the next falling edge of the WCLK signal on line 22. Since the WFCLK signal rises to a logic 1 level, the D latch 54 is
4 clocked and the Q and the $\bar{Q}$ outputs for the D latch 54 change state as shown in FIG. 9a. Also the D latch 150 is clocked by the rising edge of the signal on node 154 and the Q output of the D latch 150 passes the logic 0 level at node 148 to the Q output and into an input of the OR gate 158. Since under normal operation the output of the D latch 156 is also at a logic 0 level, the slip output at line 90 remains in a logic 0 level as shown in FIG. 9a.

However, if the rising edge of the WFSYNC' signal occurs while node 145 is at a logic 0 level, as shown in FIG. 9B, then the WFCLK signal on node 86 will remain low and the D latch 54 Will not be clocked; i.e., the Q and the $\bar{Q}$ outputs of the D latch 54 will remain in the same logic state as they were prior to the WFSYNC' signal. As described above, this operation results in a slip operation since the frame register which was being written into just prior to the WFSYNC' signal will again be written into following the next WFSYNC' signal. Also since the node 148 is at a logic 1 level when node 154, which is the C input to D latch 150, rises, then the Q output of D latch 150 will rise which will cause the slip signal on line 90 to rise indicating a slip operation has occurred.

The FIFO 10 described above is therefore able to slip on the frame boundaries, and to perform this slip operation under prescribed criteria for avoiding a contention condition, or to perform a slip operation in response to an external recenter signal.

ADDITIONAL CIRCUITRY

Figure 10A:
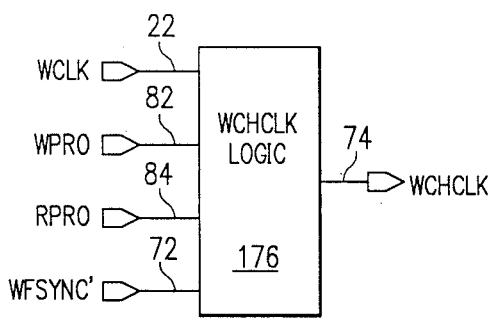
FIGS. 10A and 10B, 11, 12 and 13 are logic diagrams of portions of the logic circuitry used in the telecommunications FIFO according to the present invention.

There are several adjunct circuits to the circuitry shown in the block diagram of FIG. 8 which perform certain housekeeping functions. FIG. 10A shows a WCHCLK LOGIC block 176 which forms the WCHCLK signal on line 74. Connected as inputs to the WCHCLK LOGIC block 176 is the WCLK signal on line 22, the WPRO signal on line 82, the RPRO signal on line 84 and the WFSYNC' signal on line 72.

In operation, the WCHCLK LOGIC block 176 operates as a divide by 8 counter which simply divides the WCLK signal by eight to form the WCHCLK signal on line 74. However when the FIFO 10 is receiving or outputting T1 protocol data, then the first half cycle of the WCHCLK signal and the RCHCLK signal must be five clock periods long in order to include the framing bit within the first channel clock signal. This is performed by first determining from the WPRO and RPRO signals if T1 protocol data is being read or output by the FIFO 10. If T1 protocol data is being read or output by the FIFO 10, then the WFSYNC' signal forces the counter to count five WCLK pulses on the first half cycle of operation after receipt of the rising edge of the WFSYNC' signal before returning to a normal divide by eight operation. If the FIFO 10 is reading and writing CEPT protocol data, then the WFSYNC' input signal is ignored.

Figure 10B:
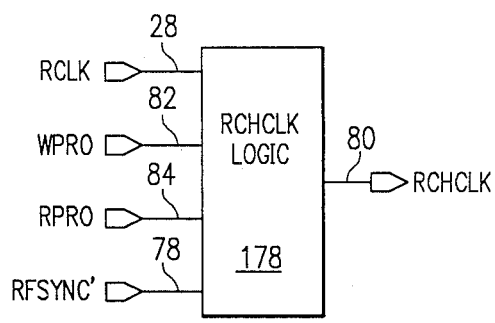

The connections to, and operation of, the RCHCLK LOGIC block 178 of FIG. 10B is the same as the WCHCLK LOGIC block 176 of FIG. 10A except that the WCLK, WFSYNC', and WCHCLK signals of FIG. 10A have been replaced by the RCLK, RFSYNC' and RCHCLK signals of FIG. 10B.

Figure 11:
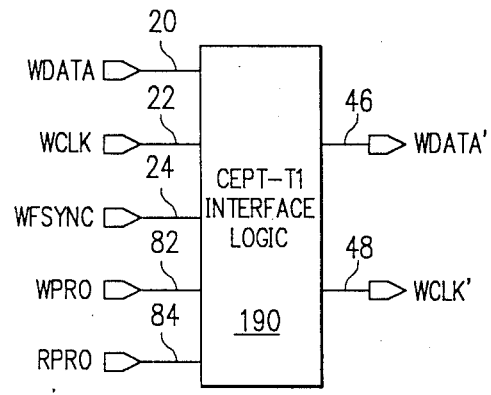

Turning now to FIG. 11, a block diagram is shown of circuitry to convert CEPT protocol data into T1 protocol data. Since the CEPT protocol data does not have an added bit for a framing bit, but does have eight additional channels, the FIFO 10 must supply the additional framing bit and must convert from 32 channel data to 24 channel data. The FIFO 10 in the preferred embodiment performs this conversion by storing the CEPT protocol data as T1 protocol data. The FIFO 10 forces a logic 1 level into the framing bit position in the frame registers X and Y and directly stores the first 192 bits while dropping the last 64 bits of each frame of the CEPT protocol data. Since, in the convention used in the preferred embodiment, the CEPT protocol frame sync pulse is coincident with the eighth bit of the 32nd channel, the FIFO 10 stores this eighth bit as a framing bit having a logical 1 level. Thus, the frame sync pulse WFSYNC on line 24 is used as the WFSYNC' pulse on line 72 in the contention logic 68.

As shown in FIG. 11 a CEPT-T1 INTERFACE LOGIC block 190 has as inputs the WDATA signal on line 20, the WCLK signal on line 22, the WFSYNC signal on line 24, the WPRO signal on line 82 and the RPRO signal on line 84. The CEPT-T1 INTERFACE LOGIC block 190 provides outputs of the WDATA' signal on line 46, and the WCLK' signal on line 48.

In operation, the CEPT-T1 INTERFACE LOGIC block 190 uses the WPRO and RPRO signals on lines 82 and 84 respectively to determine if the FIFO 10 is receiving CEPT protocol data and outputting T1 protocol data. If the FIFO 10 is receiving T1 protocol data or outputting CEPT protocol data, then the CEPT-T1 INTERFACE LOGIC block 190 will couple the WDATA signal on line 20 directly to the WDATA' signal on line 46, and the WCLK signal on line 22 directly to the WCLK' signal on line 48. However, when CEPT protocol data is being written into the FIFO 10 and T1 protocol data is being read from the FIFO 10, then the CEPT-T1 INTERFACE LOGIC block 190 will form the WDATA' signal on line 46 by holding the WDATA' signal at a logic 1 level when the WFSYNC signal on line 24 is at a logic 1 level, and by passing the logic level on the WDATA line 20 at all other times. The WCLK' signal on line 48 is formed by passing 193 pulses of the WCLK signal on line 22 after the rising edge of each WFSYNC pulse on line 24. After the 193rd clock pulse, the WCLK' signal on line 48 is held at a logic 0 level until the receipt of another WFSYNC signal on line 24. Thus the WCLK' signal on line 48 receives 193 clock pulses beginning with the WFSYNC signal and then stays inactive until the receipt of another WFSYNC signal. Therefore, during each frame time period, the frame register X or the frame register Y is loaded with a full 193 bits of data. When the WCLK' signal on line 84 is held at a logic 0 level, the incoming WDATA signal on line 20 is ignored by the write column driver/decoder 44 and the 256 bits of CEPT protocol data is truncated to 192 bits of T1 protocol data.

Figure 12:
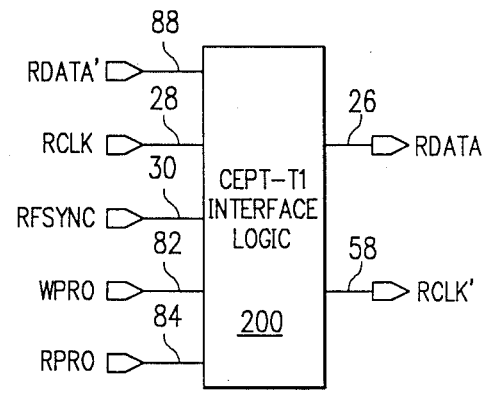

With reference now to FIG. 12, when the FIFO 10 is receiving T1 protocol data and outputting CEPT protocol data, the incoming T1 protocol data is stored directly as T1 protocol data and converted to CEPT protocol data during the read operation. In the preferred embodiment, the logic level of the framing bit of the T1 protocol data in each frame read is forced to a logic 1 level when the data is read out of the frame register X and the frame register Y. Also, logic 1 levels are output for channel positions 25 through 32 of the CEPT protocol data. In the convention used in the preferred embodiment, this logic 1 level in the framing bit position will be coincident with the CEPT protocol frame sync pulse which is the normal position of the eighth bit of the 32nd channel of CEPT protocol data.

A T1-CEPT INTERFACE LOGIC block 200 is shown in FIG. 12 and has as inputs the RDATA' signal on line 88, the RCLK signal on line 28, the RFSYNC' signal on line 78, the WPRO signal on line 82, and the RPRO signal on line 84. The T1-CEPT INTERFACE LOGIC block 200 provides outputs of the RDATA signal on line 26, and the RCLK' signal on line 58.

In operation, the T1-CEPT INTERFACE LOGIC block 200 uses the WPRO and RPRO signals on lines 82 and 84 respectively to determine if the FIFO 10 is receiving T1 protocol data and outputting CEPT protocol data. If the FIFO 10 is receiving CEPT protocol data or outputting T1 protocol data, then the T1-CEPT INTERFACE LOGIC block 200 will couple the RDATA' signal on line 88 directly to the RDATA signal on line 26, and the RCLK signal on line 28 directly to the RCLK' signal on line 58. However, when T1 protocol data is being written into the FIFO 10 and CEPT protocol data is being read from the FIFO 10, then the T1-CEPT INTERFACE LOGIC block 200 will form the RDATA signal on line 26 by passing the RDATA' signal on line 88 to the RDATA line 26 for 192 pulses of the RCLK signal on line 28 after the falling edge of the RFSYNC' pulse on line 78, and by holding the RDATA signal on line 26 to a logic 1 level until and during the presence of a positive pulse on the RFSYNC' signal line 78. The RCLK' signal on line 58 is formed by passing 193 pulses of the RCLK signal on line 28 beginning with the rising edge of the RFSYNC' pulse on line 78. After the 193rd clock pulse, the RCLK' signal on line 58 is held at a logic 0 level until the receipt of another RFSYNC' signal on line 78. Thus the RCLK' signal on line 58 receives 193 clock pulses beginning with the RFSYNC' signal and then stays inactive until the receipt of another RFSYNC' signal. Therefore, during each frame time period, a full 193 bits of data are read from the frame register X or the frame register Y.

When the FIFO 10 is receiving and outputting CEPT protocol data, then the WFSYNC signal on line 24, which is coincident with the eighth bit of the 32nd channel of the CEPT protocol data in the convention used in the preferred embodiment, is delayed for one WCLK period to form the WFSYNC' signal on line 72. This one clock period delay causes the first bit of the first channel of the CEPT protocol data to be coincident with the WFSYNC' pulse. For the same reason the RFSYNC signal on line 30 is also delayed for one RCLK period to form the RFSYNC' signal on line 78. With the rising edges of the WFSYNC' signal and the RFSYNC' signal aligned with the frame boundaries, the contention logic 68 is able to perform slip operations at the frame boundaries as described above.

Figure 13:
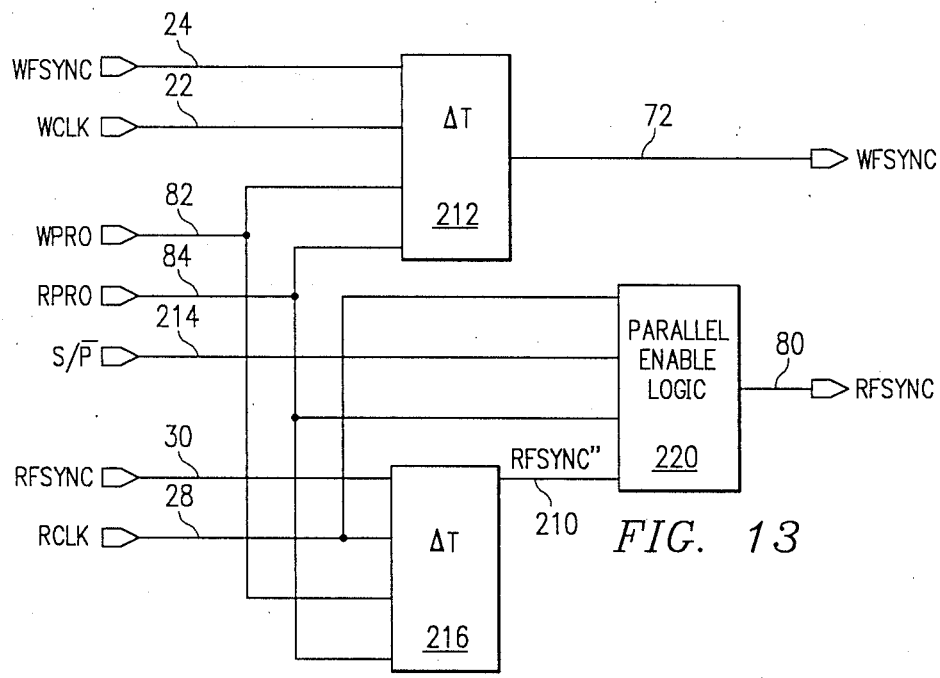

As shown in FIG. 13, a first delay circuit 212 has as inputs the WFSYNC signal on line 24, the WCLK signal on line 22, the WPRO signal on line 82 and the RPRO signal on line 84. The delay circuit 212 forms the WFSYNC' signal at an output on line 72. A second delay circuit 216 has as inputs the RFSYNC signal on line 30, the RCLK signal on line 28, the WPRO signal on line 82 and the RPRO signal on line 84. The delay circuit 216 forms the RFSYNC'' signal at an output on line 210. The RFSYNC'' signal forms an input to a PARALLEL ENABLE LOGIC block 220 used to allow the conversion of the normal serial data coming out of the FIFO 10 to parallel data as described briefly above and as will be described in more detail with respect to FIGS. 14A and 14B. The PARALLEL ENABLE LOGIC block 220 has as inputs the RFSYNC'' signal on line 210, the RCLK signal on line 28, the RPRO signal on line 84, and an $S/\overline{P}$ signal on line 214. The PARALLEL ENABLE LOGIC block 220 provides the RFSYNC' signal on line 78. The $S/\overline{P}$ signal on line 210 is an external input to the FIFO 10 and is used to signal to the FIFO 10 if the serial data is to be read out eight bits early in order to allow parallel data to be formed and available when the first bit of such eight bits would normally be read, or if standard serial data is to be output by the FIFO 10.

In operation, the delay circuits 212 and 216 use the WPRO and RPRO signals on lines 82 and 84 respectively to determine if the FIFO 10 is receiving and outputting CEPT protocol data. If the FIFO 10 is receiving or outputting T1 protocol data, then the delay circuits 212 and 216 will couple the WFSYNC signal on line 24 directly to the WFSYNC' signal on line 72, and the RFSYNC signal on line 30 directly to the RFSYNC'' signal on line 210 respectively. However, when CEPT protocol data is being written into the FIFO 10 and CEPT protocol data is being read from the FIFO 10, then the delay circuit 212 delays the WFSYNC signal on line 24 for one clock period of the WCLK signal. Similarly, the delay circuit 216 delays the RFSYNC signal on line 30 for one clock period on the RCLK signal.

The PARALLEL ENABLE LOGIC block 220 allows the user interfacing with the FIFO 10 to convert the serial data to parallel data by having the data available eight bit times early. FIG. 14A shows the timing for this parallel format when T1 protocol data is being read from the FIFO 10, and FIG. 14B shows the parallel format of the data when CEPT protocol data is being read from the FIFO 10. In both FIG. 14A and 14B, an RFSYNC' pulse is generated in order to provide, at the output terminal of the FIFO 10, a serial bit stream of early data which allows the user of the FIFO 10 to load these bits into a serial to parallel converter so that eight of the serial bits are available as parallel data when the first bit of such eight bits would normally be read.

FIG. 14B also shows the position of the RFSYNC" pulse on line 210 when the FIFO 10 is reading and outputting CEPT protocol data. As described above, the RFSYNC" pulse is delayed one RCLK clock period from the RFSYNC pulse when the FIFO 10 is reading and outputting CEPT protocol data. Since the PARALLEL ENABLE LOGIC block 220 effectively advances the RFSYNC" pulse by eight RCLK clock periods (by delaying the previous RFSYNC" pulse), the RFSYNC' signal on line 80, generated by the PARALLEL ENABLE LOGIC block 220 when the FIFO 10 is receiving CEPT protocol data (shown as "RFSYNC' (80) CEPT-CEPT" in FIG. 14B), is one RCLK clock period later than the RFSYNC' pulse generated by the PARALLEL ENABLE LOGIC block 220 when the FIFO 10 is receiving T1 protocol data (shown as "RFSYNC' (80) T1-CEPT").

The PARALLEL ENABLE LOGIC block 220 generates the RFSYNC' signal. When the S/P̄ input on line 214 is high, indicating that normal serial data is to be output from the FIFO 10, then the RFSYNC" signal on line 210 is coupled directly to the RFSYNC' signal on line 78. When the S/P̄ signal on line 214 is low, indicating that early data is to be output by the FIFO 10 to enable an external circuit to create parallel data, then the RFSYNC' signal on line 78 is formed by delaying the RFSYNC" signal on line 210 for 185 pulses of the RCLK signal on line 28 if the RPRO signal on line 84 indicates that T1 protocol data is being read from the FIFO 10, and by delaying the RFSYNC" signal on line 210 for 248 pulses of the RCLK signal on line 28 if the RPRO signal indicates that CEPT protocol is being read from the FIFO 10.

The detailed logic of the WCHCLK LOGIC block 176, the RCHCLK LOGIC block 178, the CEPT-T1 INTERFACE LOGIC block 190, the T1-CEPT INTERFACE LOGIC block 200, the delay circuits 212 and 216, and the PARALLEL ENABLE LOGIC block 220 are not shown for simplicity and to avoid surplusage since the design of these logics is well within the ability of one skilled in the art.

Thus has been described a telecommunications FIFO 10 which is able to slip on the frame boundaries, which is able to detect an impending collision in time to initiate a slip operation, which can delete/repeat exactly one frame of data during a slip, and which is suitable for use in T1, CEPT and combinations of T1/CEPT protocol communication channels.

It will also be appreciated that in the preferred embodiment the positions of the write and read pointers 92 and 94 are made available at external pins of the FIFO 10 to allow the user to monitor the relative positions of these two pointers and by using a different collision anticipation criteria, can cause slip operations to occur by issuing a recenter command at the time that the user considers proper.

Although the invention has been described in part by making detailed reference to a certain specific embodiment, such details are intended to be, and will be understood to be, instructional rather than restrictive. It will be appreciated by those of ordinary skill in the art that many variations can be made in a structure and mode of operation without departing from the spirit and scope of the invention as disclosed in the teachings herein. For example, more than two frame registers could be used to store data, this making a larger FIFO buffer. Also the FIFO of the present invention can be modified to interface with CEPT protocol data which has the frame sync pulse aligned with the first bit of the first channel, and can be modified to operate with serial data transmission protocols other than T1 and CEPT.

What is claimed is:

1. A FIFO memory for receiving and storing a synchronous serial bit stream of N-bit packets of data, and for reading out corresponding stored data, comprising:
   a first register having N storage locations;
   a second register having N storage locations;
   write circuitry for writing data into said first register until said FIFO memory has received and written an N-bit packet of data into said N storage locations in said first register and for writing data into said second register until said FIFO memory has received and stored an N-bit packet of data into said second register;
   write register selection circuitry for selecting which register is to be written into by said write circuitry;
   read circuitry for reading at least a portion of the data bits stored in said N memory locations of said first register and for reading at least a portion of the data bits stored in said N storage locations of said second register;
   read register selection circuitry for selecting which register is to be read from by said read circuitry; and
   circuitry for detecting whether the storage location being read from and the storage location being written into are in a predetermined relationship with each other at a time when data is being written into said first register, and, if such predetermined relationship exits, for causing said write register selection circuitry to cause the next N-bit packet of data to be written into said first register at the completion of writing the present N-bit packet of data into said first register, and if said predetermined relationship does not exist, for causing said write register selection circuitry to cause the next N-bit packet of data to be written into said second register upon the completion of the writing of the present N-bit packet of data into said first register;
   wherein said predetermined relationship indicates whether a collision is predictable within the next frame of data.

2. The FIFO memory of claim 1, wherein said circuitry for detecting also
   detects whether the storage location being read from and the storage location being written into are in a predetermined relationship with each other at a time when data is being written into said second register,
   and, if such predetermined relationship exists, causes said write register selection circuitry to cause the next N-bit packet of data to be written into said second register at the completion of writing the present N-bit packet of data into said second register,
   and, if said predetermined relationship does not exist, causes said write register selection circuitry to cause the next N-bit packet of data to be written into said first register upon the completion of the writing of the present N-bit packet of data into said second register.

3. The FIFO of claim 1, wherein said read register selection circuitry consists essentially of a flip-flop.

4. The FIFO of claim 1, wherein said write register selection circuitry consists essentially of a flip-flop.

5. The FIFO of claim 1, wherein said write circuitry is connected to receive data which is synchronously formatted, in frames each containing multiple channels which each contain multiple bits, according to a first protocol, and wherein said read circuitry is connected to output data according to said first protocol, and wherein said predetermined criterion tests whether the storage location being written into is within two channels of the storage location being read from.

6. The FIFO of claim 1, wherein said write circuitry is connected to receive data which is synchronously formatted, in frames each containing multiple channels which each contain multiple bits, according to a first protocol, and wherein said read circuitry is connected to output data according to said first protocol, and wherein said predetermined criterion tests whether the storage location being written into is within one channel of the storage location being read from.

7. The FIFO of claim 1, wherein said write circuitry is connected to receive data which is synchronously formatted, in frames each containing multiple channels which each contain multiple bits, according to a first protocol, and wherein said read circuitry is connected to output data which is synchronously formatted, according to a second protocol, in frames each containing multiple channels which each contain multiple bits, wherein said second protocol has a net data rate which is significantly different from that of said first protocol, and wherein said predetermined criterion indicates whether the storage location being written into is separated from the storage location being read from by less than a number of channels which depends on the ratio of the data rates of said first and second protocols and on the frame length of at least one of said protocols.

8. The FIFO of claim 1, wherein said FIFO is connected to receive data which is synchronously formatted in frames, and wherein, depending on said predetermined criterion, the register selection performed by said read register selection circuitry can cause said reading circuitry to omit reading an entire frame of data which has been written by said writing circuitry.

9. A FIFO memory for receiving and storing a synchronous serial bit stream of N-bit packets of data, and for reading out corresponding stored data, comprising:
a first register having N storage locations;
a second register having N storage locations;
write circuitry for writing data into said first register and for writing data into said second register;
write register selection circuitry for selecting which register data is to be written into;
read circuitry for reading data from said first register until an N-bit packet of data has been read from said N storage locations in said first register and for reading data from said second register until an N-bit packet of data has been read from said N storage locations in said second register;
read register selection circuitry for selecting which register data is to be read from; and
circuitry for detecting whether the storage location being read from and the storage location being written into are in a predetermined relationship with each other at a time when data is being read from said first register, and if such predetermined relationship exists, for causing said read register selection circuitry to cause the next N-bit packet of data to be read from said first register at the completion of reading the present N-bit packet of data from said first register, and if said predetermined relationship does not exist, for causing said read register selection circuitry to cause the next N-bit packet of data to be read from said second register upon the completion of the reading of the present N-bit packet of data from said first register;
wherein said predetermined relationship indicates whether a collision is predictable within the next frame of data.

10. The FIFO memory of claim 9, wherein said circuitry for detecting also
detects whether the storage location being read from and the storage location being written into are in a predetermined relationship with each other at a time when data is being read from said second register,
and if such predetermined relationship exists, causes said read register selection circuitry to cause the next N-bit packet of data to be read from said second register at the completion of reading the present N-bit packet of data from said second register,
and if said predetermined relationship does not exist, causes said read register selection circuitry to cause the next N-bit packet of data to be read from said first register upon the completion of the reading of the present N-bit packet of data from said second register.

11. The FIFO of claim 9, wherein said FIFO is connected to receive data which is synchronously formatted in frames, and wherein, depending on said predetermined criterion, the register selection performed by said read register selection circuitry can cause said reading circuitry to omit reading an entire frame of data which has been written by said writing circuitry.

12. The FIFO of claim 9, wherein said read register selection circuitry consists essentially of a flip-flop.

13. The FIFO of claim 9, wherein said write circuitry is connected to receive data which is synchronously formatted, in frames each containing multiple channels which each contain multiple bits, according to a first protocol, and wherein said read circuitry is connected to output data according to said first protocol, and wherein said predetermined criterion tests whether the storage location being written into is within one channel of the storage location being read from.

14. The FIFO of claim 9, wherein said write circuitry is connected to receive data which is synchronously formatted, in frames each containing multiple channels which each contain multiple bits, according to a first protocol, and wherein said read circuitry is connected to output data according to said first protocol, and wherein said predetermined criterion tests whether the storage location being written into is within two channels of the storage location being read from.

15. The FIFO of claim 9, wherein said write circuitry is connected to receive data which is synchronously formatted, in frames each containing multiple channels which each contain multiple bits, according to a first protocol, and wherein said read circuitry is connected to output data which is synchronously formatted, according to a second protocol, in frames each containing multiple channels which each contain multiple bits, wherein said second protocol has a net data rate which is significantly different from that of said first protocol, and wherein said predetermined criterion indicates whether the storage location being written into is separated from the storage location being read from by less than a number of channels which depends on the ratio of the data rates of said first and second protocols and on the frame length of at least one of said protocols.

16. An apparatus for receiving and storing serial data which is synchronously formatted in frames, and for reading out corresponding data, comprising:
   write circuitry for sequentially writing data into a first register having a plurality of storage locations and for sequentially writing data into a second register having a plurality of storage locations;
   write register selection circuitry for selecting which register data is top be written into;
   read circuitry for sequentially reading data from said first register and for sequentially reading data from said second register;
   read register selection circuitry for selecting which register data is to be read from; and
   circuitry for sampling at predetermined intervals the relative relationship of the storage location being written into and the storage location being read from, and if said relative relationship satisfies a predetermined criterion, for causing said write register selection circuitry to change the register being written into, and if such relative relationship is not satisfied, for causing said write register selection circuitry to continue to write data to the same register;
   wherein said predetermined criterion indicates whether a collision is predictable within the next frame of data;
   wherein said write circuitry is connected to receive data which is synchronously formatted, in frames each containing multiple channels which each contain multiple bits, according to a first protocol, and wherein said read circuitry is connected to output data which is synchronously formatted, according to a second protocol, in frames each containing multiple channels which each contain multiple bits, wherein said second protocol has a net data rate which is significantly different from that of said first protocol, and wherein said predetermined criterion indicates whether the storage location being written into is separated from the storage location being read from by less than a number of channels which depends on the ratio of the data rates of said first and second protocols and on the frame length of at least one of said protocols.

17. An apparatus for receiving and storing serial data which is synchronously formatted in frames, and for reading out corresponding data, comprising:
   write circuitry for sequentially writing data into a first register having a plurality of storage locations and for sequentially writing data into a second register having a plurality of storage locations;
   write register selection circuitry for selecting which register data is to be written into;
   read circuitry for sequentially reading data from said first register and for sequentially reading data from said second register;
   read register selection circuitry for selecting which register data is to be read from; and
   circuitry for sampling at predetermined intervals the relative relationship of the storage location being written into and the storage location being read from, and if said relative relationship satisfies a predetermined criterion, for causing said write register selection circuitry to change the register being written into, and if such relative relationship is not satisfied, for causing said write register selection circuitry to continue to write data to the same register;
   wherein said predetermined criterion indicates whether a collision is predictable within the next frame of data;
   wherein said write circuitry is connected to receive data which is synchronously formatted, in frames each containing multiple channels which each contain multiple bits, according to a first protocol, and wherein said read circuitry is connected to output data which is synchronously formatted, according to a second protocol, in frames each containing multiple channels which each contain multiple bits, wherein said second protocol has a net data rate which is significantly different from that of said first protocol, and wherein said predetermined criterion indicates whether the storage location being written into is separated from the storage location being read from by less than a number of channels which depends on the ratio of the data rates of said first and second protocols and on the frame length of at least one of said protocols.

* * * * *